(12) United States Patent
Park et al.

(10) Patent No.: US 11,470,639 B2
(45) Date of Patent: *Oct. 11, 2022

(54) METHOD FOR TRANSMITTING AND RECEIVING UPLINK SIGNAL IN WIRELESS COMMUNICATION SYSTEM SUPPORTING UNLICENSED BAND, AND APPARATUS SUPPORTING SAME

(71) Applicant: LG ELECTRONICS INC., Seoul (KR)

(72) Inventors: Hanjun Park, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

This patent is subject to a terminal disclaimer.

(21) Appl. No.: 16/922,685

(22) Filed: Jul. 7, 2020

(65) Prior Publication Data

US 2020/0337086 A1 Oct. 22, 2020

Related U.S. Application Data

(63) Continuation of application No. 16/071,219, filed as application No. PCT/KR2017/002517 on Mar. 8, 2017, now Pat. No. 10,736,140.
(Continued)

(51) Int. Cl.
*H04W 74/08* (2009.01)
*H04W 72/04* (2009.01)

(52) U.S. Cl.
CPC ... *H04W 74/0808* (2013.01); *H04W 72/0446* (2013.01)

(58) Field of Classification Search
CPC ............ H04W 74/0808; H04W 72/0446
See application file for complete search history.

(56) References Cited

U.S. PATENT DOCUMENTS

2001/0034205 A1 10/2001 Tarr
2005/0100120 A1 5/2005 Barton et al.
(Continued)

OTHER PUBLICATIONS

Alu et al., "Way Forward on Channel Access for Multiple Priority Classes" 3GPP TSG RAN WG1 Meeting #83, R1-157841, Anaheim, USA, Nov. 15-22, 2015, 6 pages.
(Continued)

*Primary Examiner* — Brian D Nguyen
(74) *Attorney, Agent, or Firm* — Birch, Stewart, Kolasch & Birch, LLP

(57) ABSTRACT

A method of a user equipment (UE) in a wireless communication system supporting an unlicensed band, includes performing a channel access procedure (CAP) based on a first channel access priority class parameter; receiving, from a base station (BS) a signal including a second channel access priority class parameter and scheduling information for uplink transmission in a specific time resource; performing the CAP based on the first channel access priority class parameter continuously based on that the first channel access priority class parameter is equal to or greater than the second channel access priority class parameter indicated in the signal; performing the CAP based on the second channel access priority class parameter indicated in the signal based on that the first channel access priority class parameter is less than the second channel access priority class parameter; and performing uplink transmission based on a result of the performed CAP.

6 Claims, 23 Drawing Sheets

Related U.S. Application Data

(60) Provisional application No. 62/315,100, filed on Mar. 30, 2016, provisional application No. 62/305,496, filed on Mar. 8, 2016.

(56) References Cited

U.S. PATENT DOCUMENTS

| | | | |
|---|---|---|---|
| 2007/0087756 A1 | 4/2007 | Hoffberg | |
| 2009/0201862 A1 | 8/2009 | Okker et al. | |
| 2010/0165893 A1 | 7/2010 | Edwards | |
| 2014/0362780 A1 | 12/2014 | Malladi et al. | |
| 2015/0163680 A1 | 6/2015 | Valliappan et al. | |
| 2015/0373741 A1 | 12/2015 | Yerramalli et al. | |
| 2018/0063871 A1* | 3/2018 | Cheng | H04W 74/004 |
| 2018/0317244 A1* | 11/2018 | Um | H04W 72/042 |
| 2018/0376343 A1* | 12/2018 | Harada | H04L 5/0048 |
| 2019/0014596 A1* | 1/2019 | Yang | H04W 72/085 |
| 2020/0037362 A1* | 1/2020 | Noh | H04L 1/1812 |
| 2020/0205201 A1* | 6/2020 | Noh | H04W 74/0816 |
| 2020/0329493 A1* | 10/2020 | Yang | H04W 72/085 |

OTHER PUBLICATIONS

Ericsson, "Further Details on LBT Design in DL for LAA" 3GPP TSG RAN WG1 Ad-hoc Meeting, R1-151131, Paris, France, Mar. 24-26, 2015, 7 pages.

LG Electronics, "LBT schemes in LAA UL," 3GPP TSG RAN WG1 meeting #84, R1-160630, St Julian's, Malta, Feb. 15-19, 2016, 10 pages.

Myles, "Proposed comments to 3GPP in relation to LAA," IEEE P802.19, Mar. 2016 (Feb. 16, 2016), pp. 1-16.

NEC, "LBT options for UL transmission," 3GPP TSG RAN2 Meeting #89bis, R2-151414, Bratislava, Slovakia, Apr. 20-24, 2015, 3 pages.

* cited by examiner (a)

(b)

METHOD FOR TRANSMITTING AND RECEIVING UPLINK SIGNAL IN WIRELESS COMMUNICATION SYSTEM SUPPORTING UNLICENSED BAND, AND APPARATUS SUPPORTING SAME

CROSS REFERENCE TO RELATED APPLICATIONS

This application is a Continuation of U.S. patent application Ser. No. 16/071,219 filed on Jul. 19, 2018 (now U.S. Pat. No. 10,736,140, issued on Aug. 4, 2020), which is the National Phase of PCT International Application No. PCT/KR2017/002517, filed on Mar. 8, 2017, which claims priority under 35 U.S.C. 119(e) to U.S. Provisional Application Nos. 62/305,496, filed on Mar. 8, 2016 and 62/315,100, filed on Mar. 30, 2016, all of these applications are hereby expressly incorporated by reference into the present application.

BACKGROUND OF THE INVENTION

Field of the Invention

Following description relates to a wireless communication system supporting an unlicensed band, and more particularly, to a method of transmitting and receiving an uplink signal between a user equipment and a base station in a wireless communication system supporting an unlicensed band and apparatuses supporting the method.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

When a UE performs LBT (listen-before-talk)-based uplink signal transmission, an object of the present invention is to provide a method for the UE to transmit an uplink signal by efficiently performing an uplink LBT operation.

It will be appreciated by persons skilled in the art that the objects that could be achieved with the present disclosure are not limited to what has been particularly described hereinabove and the above and other objects that the present disclosure could achieve will be more clearly understood from the following detailed description.

SUMMARY OF THE INVENTION

The present invention proposes a method of transmitting and receiving an uplink signal between a user equipment and a base station in a wireless communication system supporting an unlicensed band and apparatuses supporting the method.

To achieve these and other advantages and in accordance with the purpose of the present invention, as embodied and broadly described, according to one embodiment, a method of transmitting an uplink signal, which is transmitted by a user equipment (UE) to a base station in a wireless communication system supporting an unlicensed band includes receiving a signal for scheduling uplink transmission in an Nth (N is a natural number) subframe from the base station, if there is a currently performed first LBT (listen-before-talk) prior to the Nth subframe and a channel access priority class of a first LBT parameter for the first LBT is equal to or greater than a channel access priority class of a second LBT parameter for a second LBT indicated for the Nth subframe, continuously performing the currently performed first LBT, if there is the currently performed first LBT prior to the Nth subframe and the channel access priority class of the first LBT parameter for the first LBT is less than the channel access priority class of the second LBT parameter for the second LBT, performing the second LBT, and performing uplink transmission based on a result of the LBT performed by the UE.

To further achieve these and other advantages and in accordance with the purpose of the present invention, according to a different embodiment, a user equipment transmitting an uplink signal to a base station in a wireless communication system supporting an unlicensed band includes a receiver, a transmitter, and a processor configured to operate in a manner of being connected with the receiver and the transmitter, the processor configured to receive a signal for scheduling uplink transmission in an Nth (N is a natural number) subframe from the base station, the processor, if there is a currently performed first LBT (listen-before-talk) prior to the Nth subframe and a channel access priority class of a first LBT parameter for the first LBT is equal to or greater than a channel access priority class of a second LBT parameter for a second LBT indicated for the Nth subframe, configured to continuously perform the currently performed first LBT, the processor, if there is the currently performed first LBT prior to the Nth subframe and the channel access priority class of the first LBT parameter for the first LBT is less than the channel access priority class of the second LBT parameter for the second LBT, configured to perform the second LBT, the processor configured to perform uplink transmission based on a result of the LBT performed by the UE.

In this case, if there is the currently performed first LBT prior to the Nth subframe and the channel access priority class of the first LBT parameter for the first LBT is less than the channel access priority class of the second LBT parameter for the second LBT, the UE may terminate the first LBT.

And, when the UE performs the second LBT, it may include initializing operation of the first LBT performed by the UE and performing the second LBT.

And, if there is uplink transmission in a subframe before the Nth subframe, the UE can further perform uplink transmission in the Nth subframe without an LBT operation.

Technical solutions obtainable from the present invention are non-limited the above-mentioned technical solutions. And, other unmentioned technical solutions can be clearly understood from the following description by those having ordinary skill in the technical field to which the present invention pertains.

As is apparent from the above description, the embodiments of the present disclosure have the following effects.

According to the present invention, a UE receives LBT parameter information to transmit an uplink signal to a base station and can perform UL LBT based on the LBT parameter information in a wireless access system supporting an unlicensed band.

In particular, according to the present invention, a UE can perform more flexible LBT based on LBT parameter information indicated by a base station and can more efficiently perform uplink transmission based on the LBT parameter information.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

DETAILED DESCRIPTION OF THE EMBODIMENTS

Figure 1:
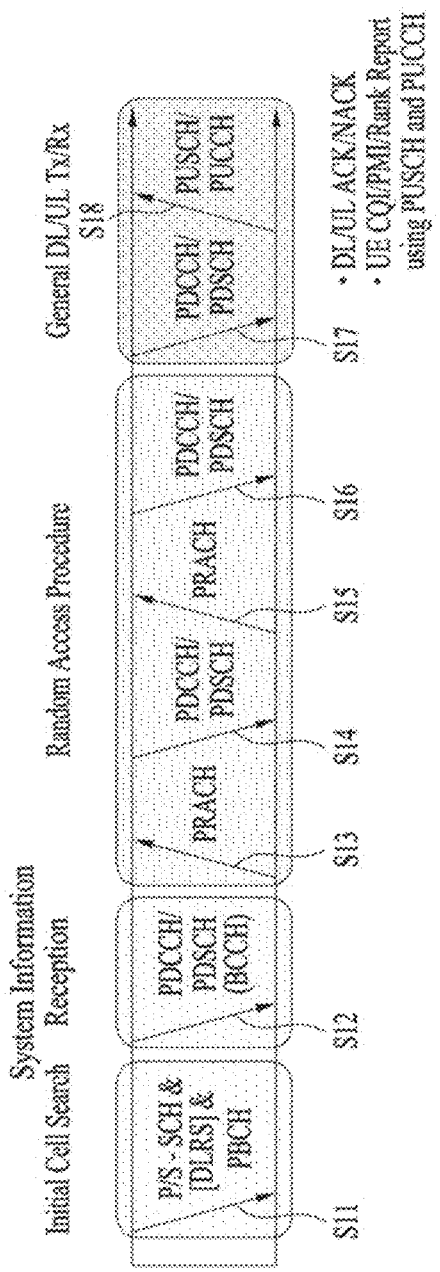
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
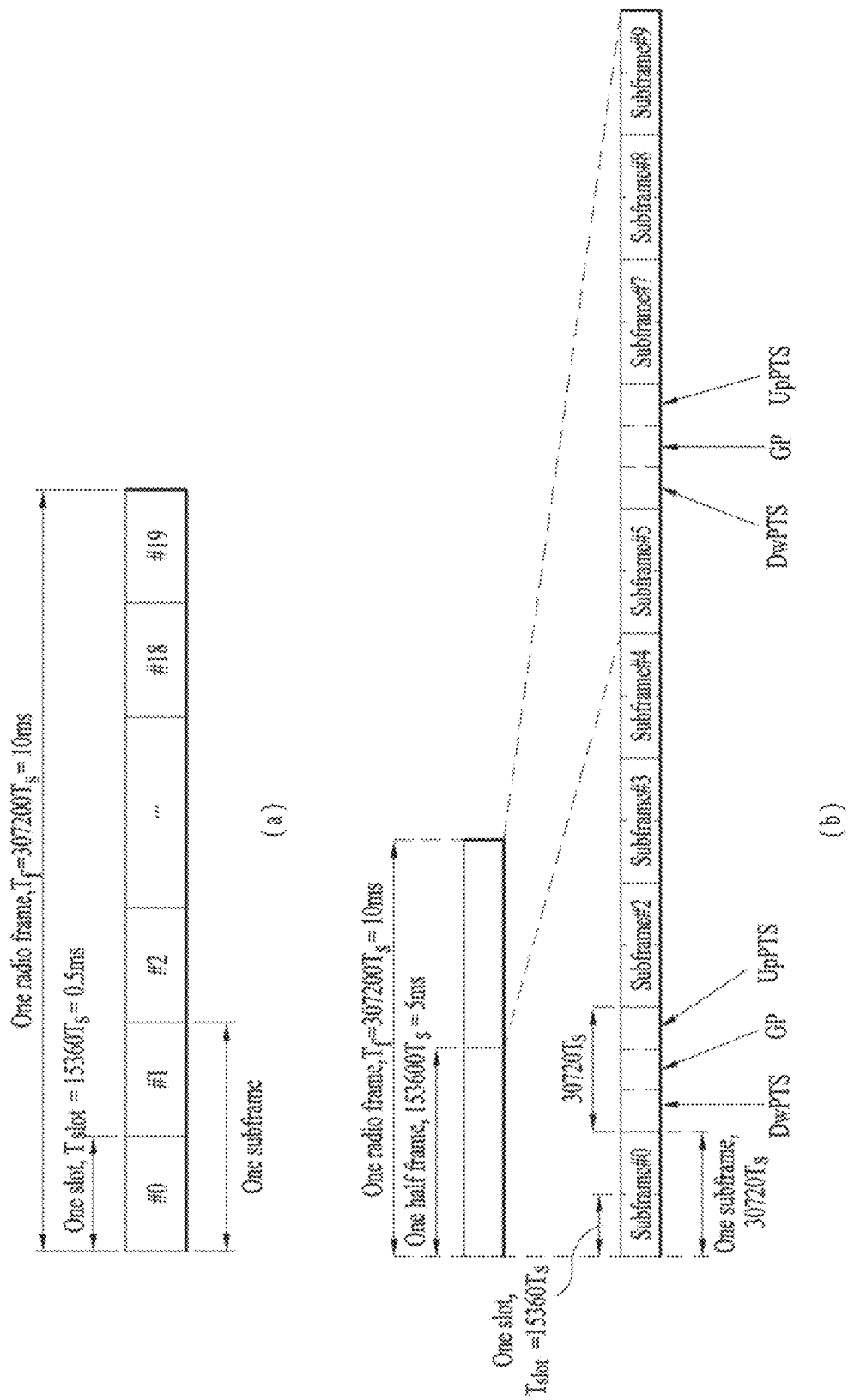
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
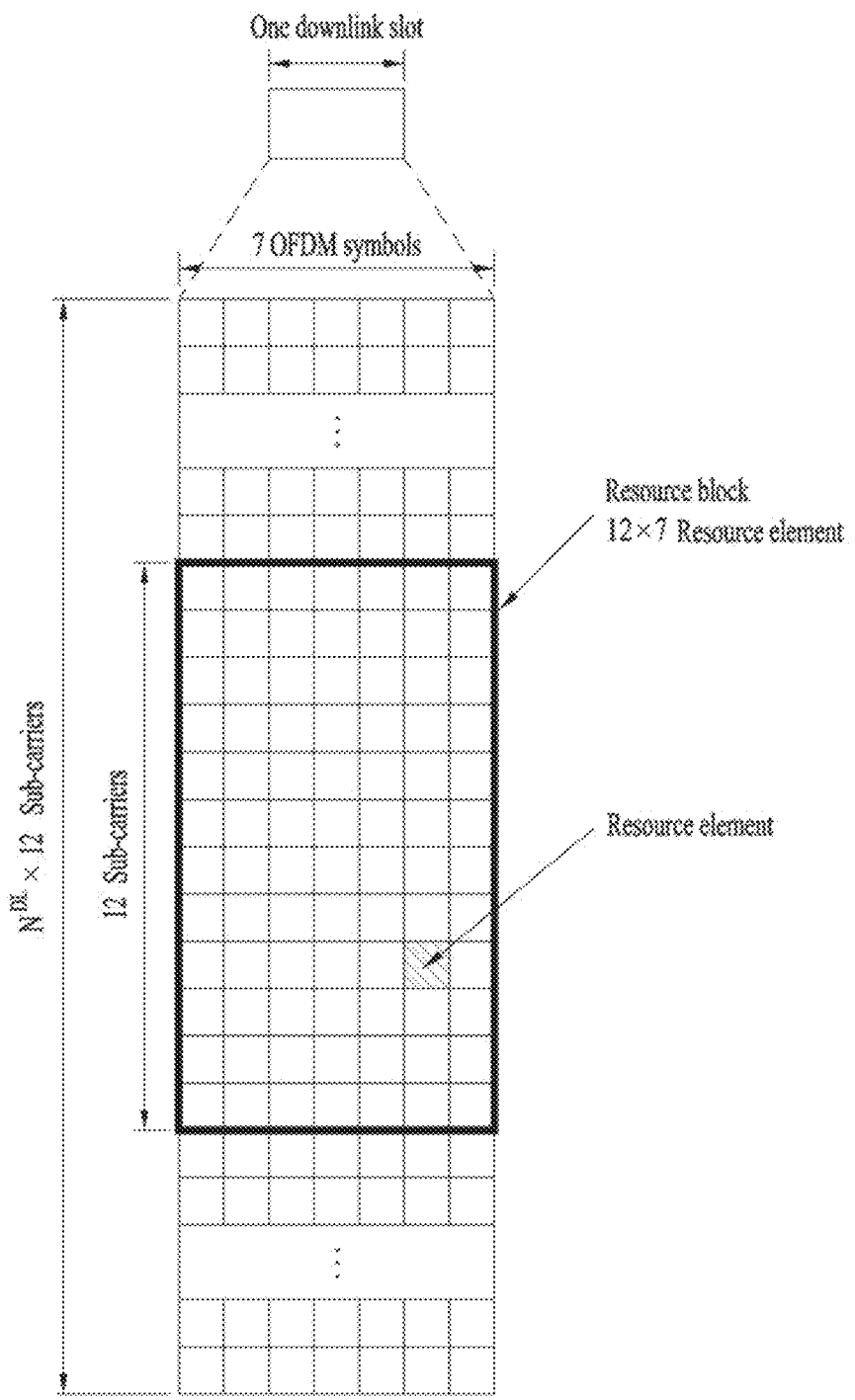
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
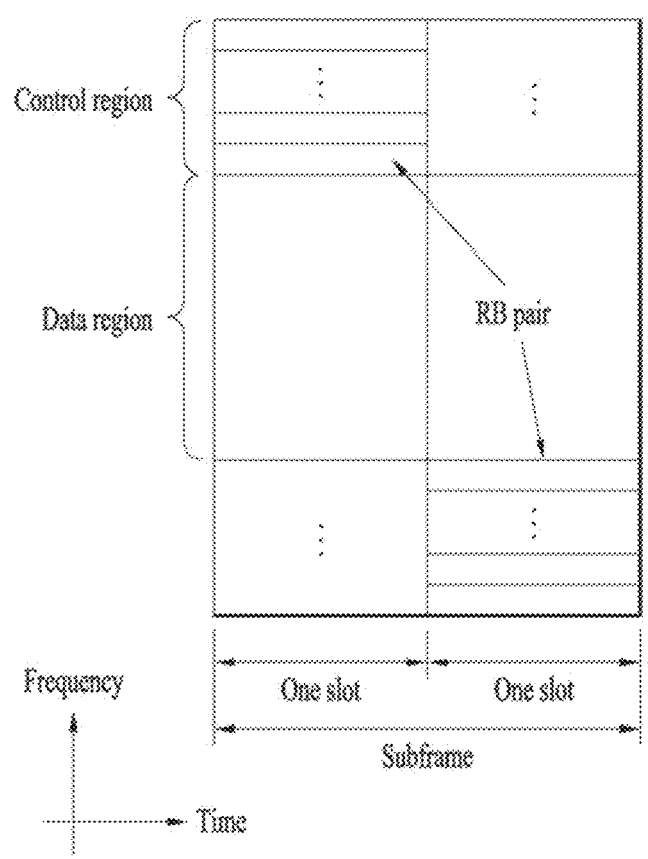
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
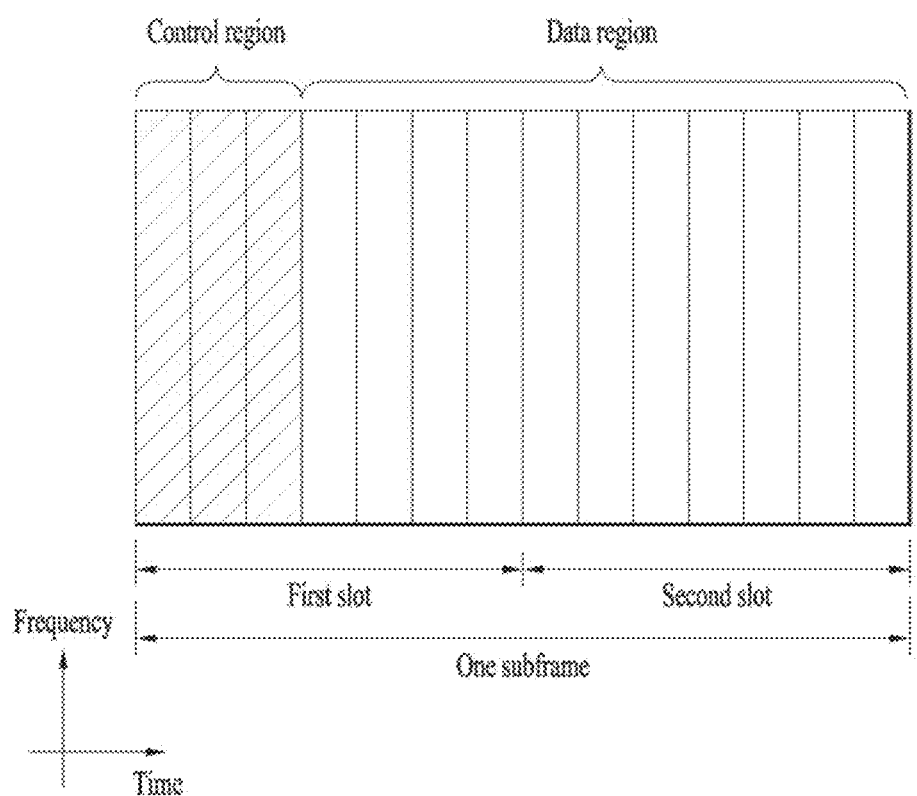
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
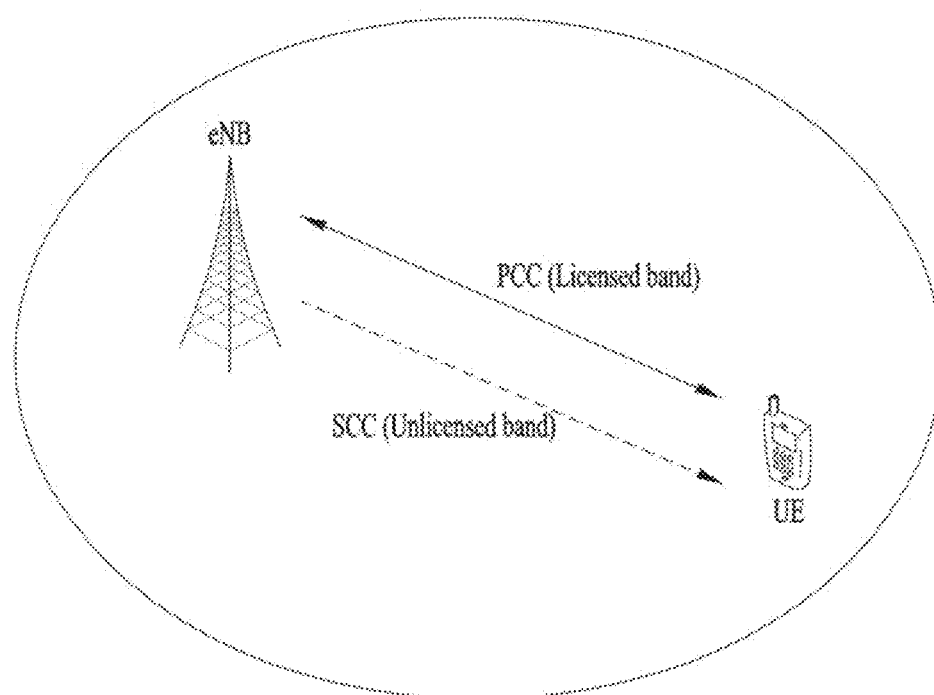
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
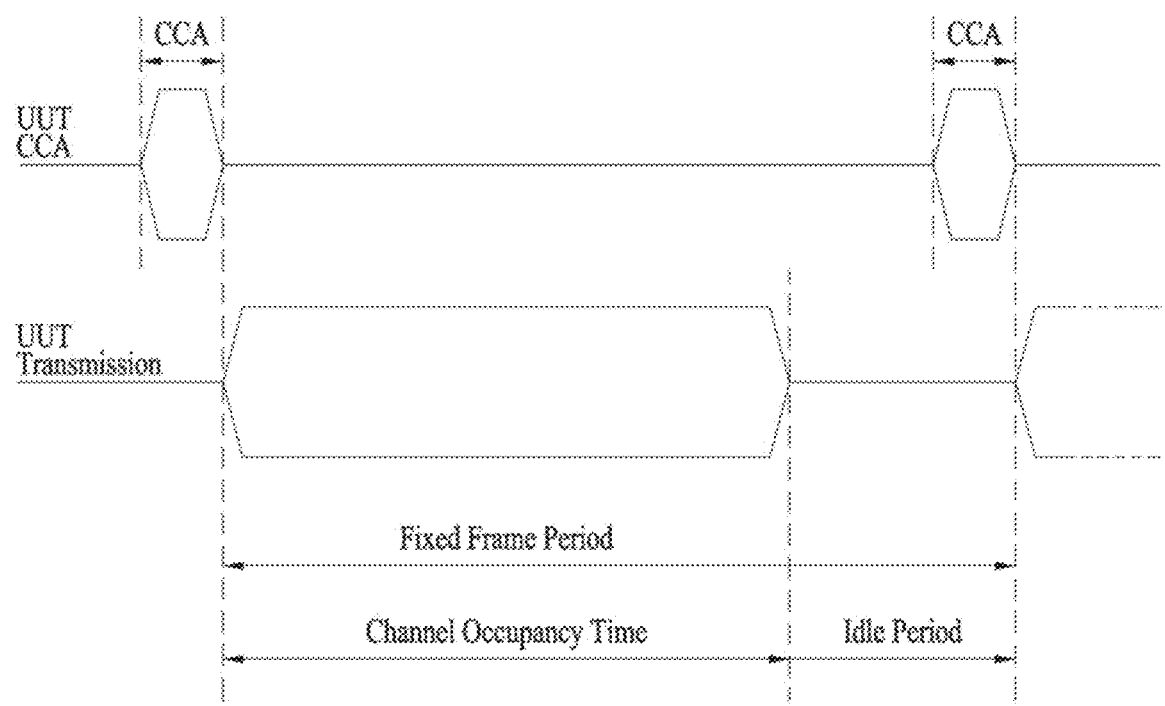
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
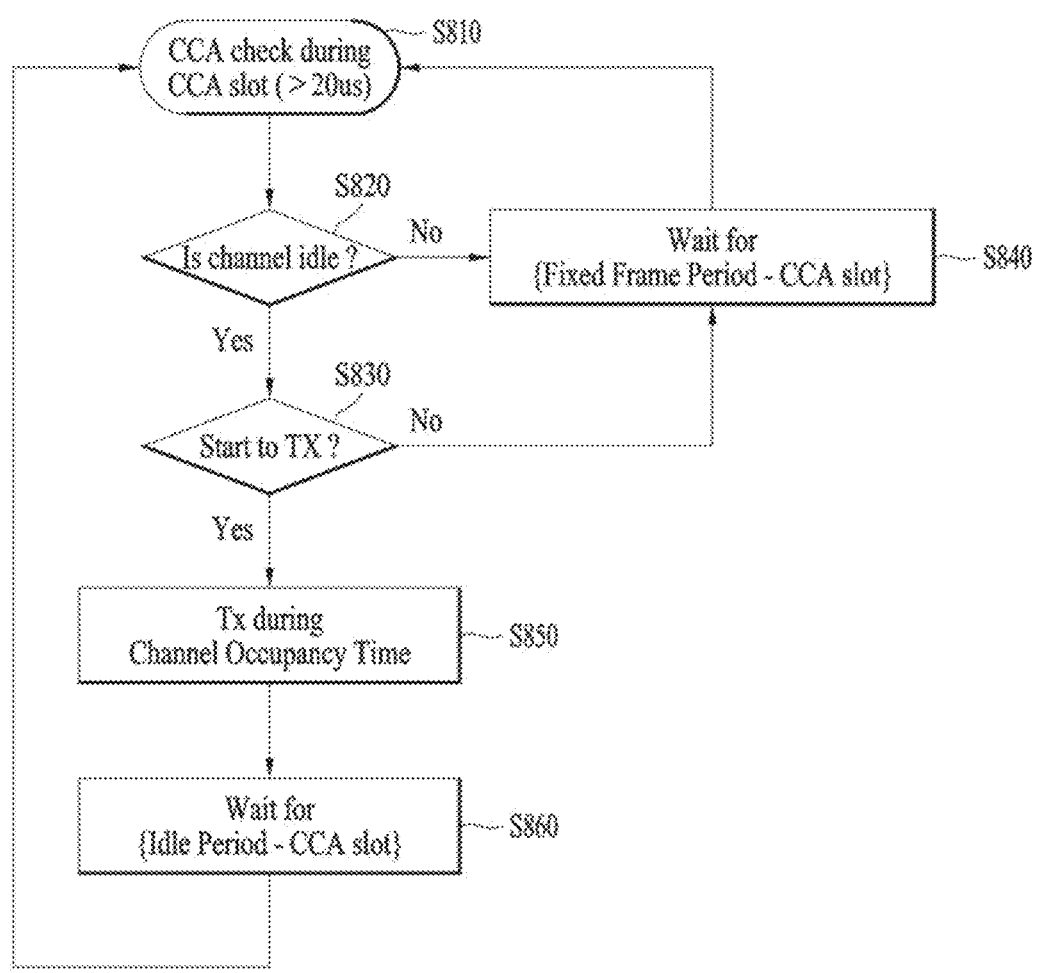
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 9:
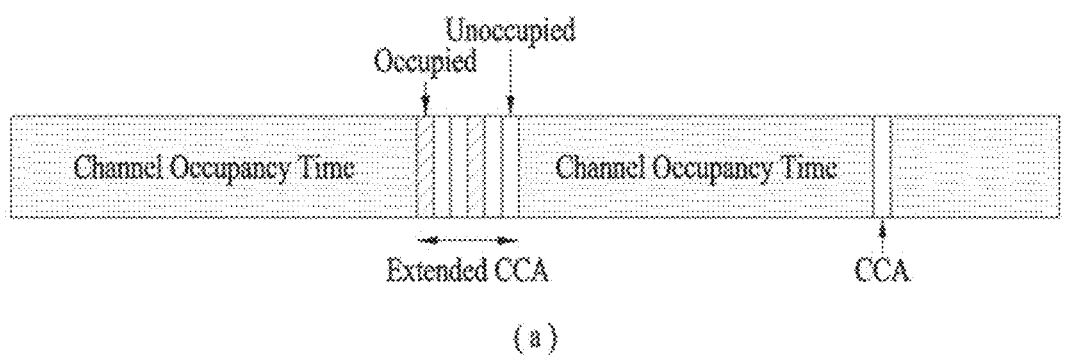
FIG. 9 is a diagram illustrating an exemplary Load Based Equipment (LBE) operation as one of the LBT operations.
Figure 9:
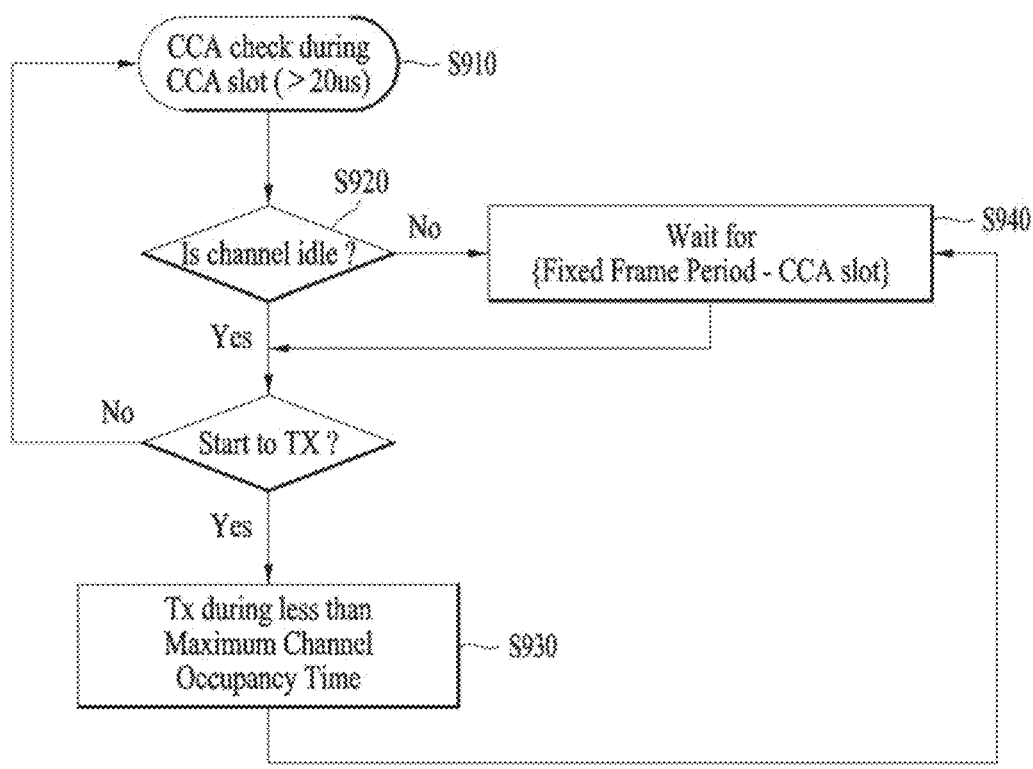

FIG. 9 is a view illustrating an exemplary LBE operation as one of the LBT operations.

Referring to FIG. 9(*a*), in LBE, the communication node first sets q (q ∈ {4, 5, . . . , 32}) and then performs CCA during one CCA slot.

FIG. 9(*b*) is a block diagram illustrating the LBE operation. The LBE operation will be described with reference to FIG. 9(*b*).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N ∈ {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
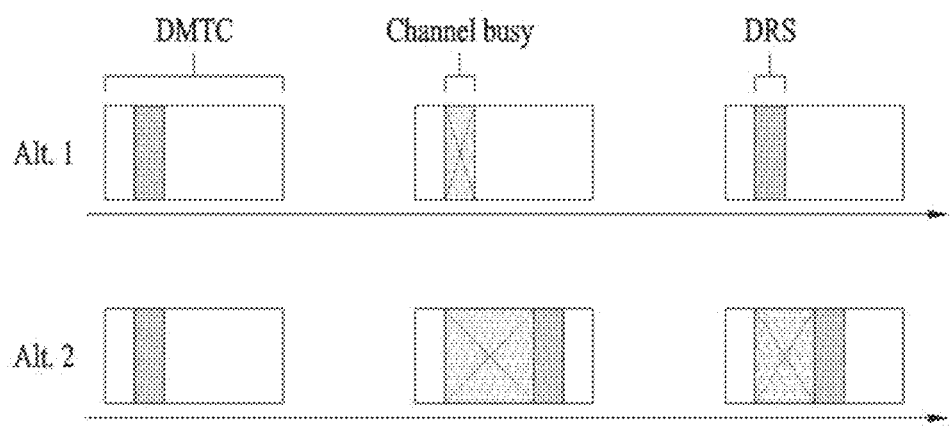
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
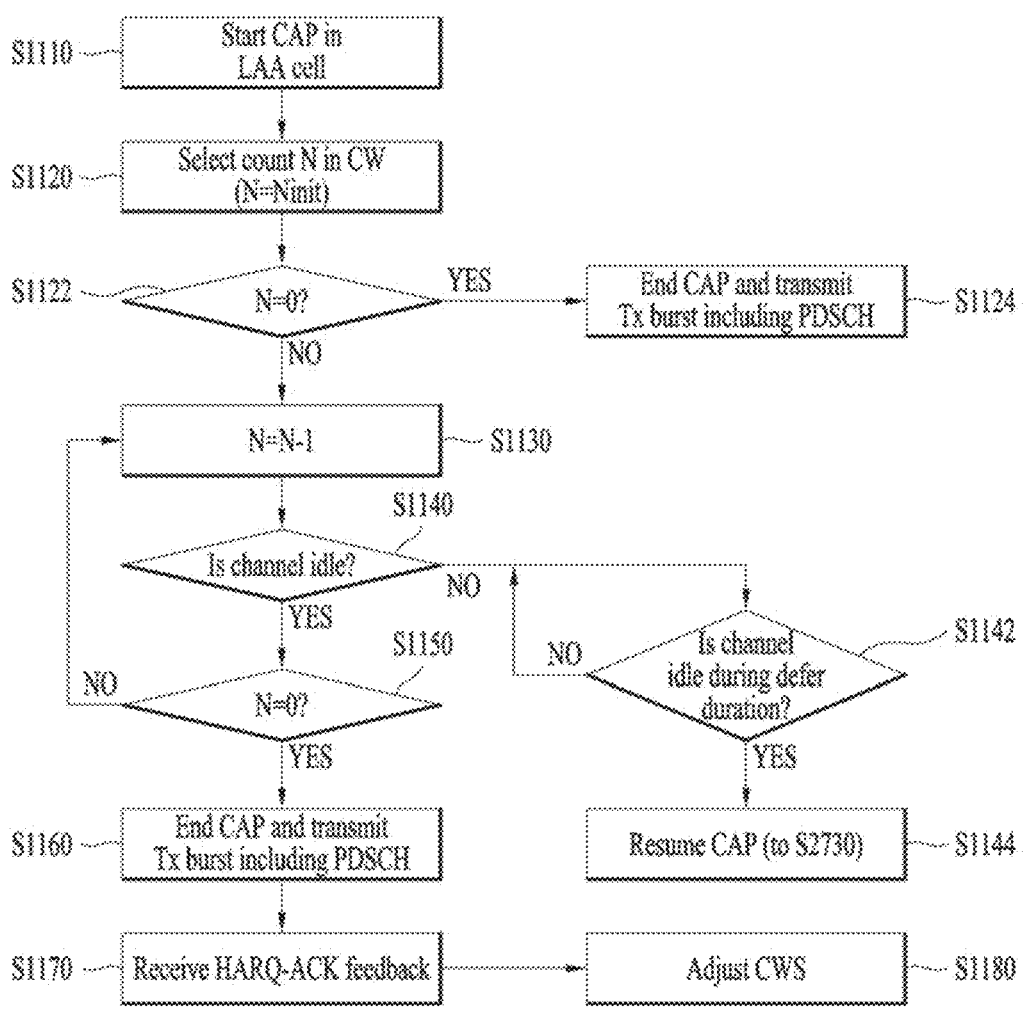
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to CWp.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
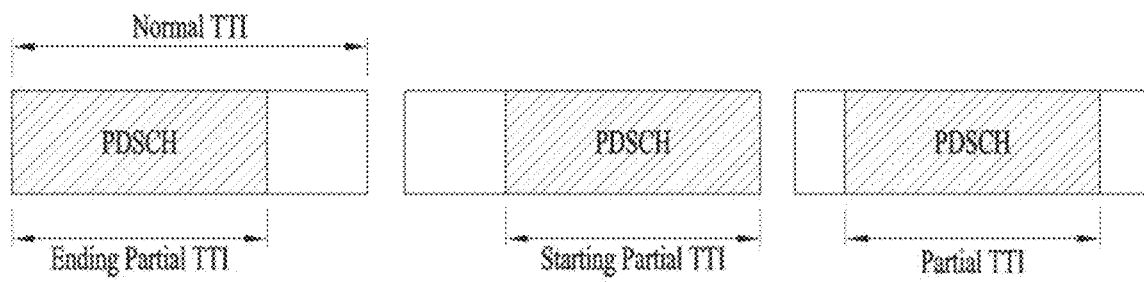
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

LTE Rel-14 system supports UL transmission in LAA. To this end, it may be able to define channel access priority class for the UL transmission as well. Similar to DL LBT of LTE Rel-13 LAA, if a UE performs a UL LBT operation based on an LBT parameter according to a specific channel access priority class X to transmit a UL TX burst, the UE can transmit only UL traffic corresponding to a channel access priority class Y equal to or higher than the channel access priority class X (i.e., Y≤X) on PUSCH within the UL TX burst. In this case, if there is no UL traffic corresponding to the channel access priority class Y, the UE may transmit UL traffic corresponding to a channel access priority class Z having a priority lower than the channel access priority X.

The present invention proposes a method for a user equipment to configure a UL TX burst using channel access priority class information configured according to a scheduled UL subframe, a method of configuring COT and MCOT, and a method for the UE to configure a UL TX burst using an LBT parameter and TX gap information. In the following description, for clarity, a channel access priority class is referred to as an LBT priority class. In this case, as a value of the LBT priority class is getting bigger, it may indicate that a priority is getting lower. In the following description, for clarity, although operations of the present invention are explained on the basis of LTE system, the operations of the present invention can be applied to any wireless communication system performing LBT-based transmission.

3.1 Method of Configuring LBT Priority Class for UL TX Burst 3.1.1 Method 1

A base station can configure an LBT priority class including information on an LBT parameter (defer time, a CW size, MCOT, etc.) or types (e.g., best effort, VoIP, etc.) of UL traffic capable of being transmitted in a corresponding UL subframe for all UL subframes scheduled via a UL grant (or common DCI). In this case, if the base station performs multi-subframe scheduling based on a single UL grant, LBT priority class information included in the UL grant can be applied to all of a plurality of scheduled subframes.

In this case, when an LBT priority class is set to a specific UL subframe, a UE may be able to transmit UL traffic corresponding to an LBT priority class equal to or higher than the LBT priority class set to the specific UL subframe via PUSCH or may be able to perform PUCCH transmission. If the UL traffic does not exist, the UE can transmit UL traffic corresponding to an LBT priority class lower than the LBT priority class set to the specific UL subframe.

As mentioned in the foregoing description, discussion on an LAA UL operation is in progress in LTE Rel-14 system. In particular, when a base station transmits a UL grant via a U-Scell (e.g., self-carrier scheduling case), the base station schedules PUSCH transmission for a plurality of UL subframes in a single DL subframe. In particular, discussion on a multi-subframe scheduling method is in progress to mitigate control overhead of the UL grant transmission.

As an example of configuring LBT priority class for a UL TX burst, a base station indicates a UE to transmit a UL TX burst via the multi-subframe scheduling and can indicate a lowest LBT priority class of the UL TX burst. According to the method, since the base station always indicates the UL TX burst using the multi-subframe scheduling, single subframe scheduling can be utilized for transmitting a single UL subframe only. In particular, it may set a limit on a UL scheduling method of the base station.

Hence, preferably, if the base station configures an LBT priority class according to a UL subframe, the UE can configure a UL TX burst based on information on the LBT priority class configured according to the UL subframe. In this case, the base station can configure an LBT priority class according to each UL subframe via a UL grant. If the base station performs multi-subframe scheduling via a single UL grant, since the multi-subframe scheduling is performed for the purpose of UL transmission within the same UL TX burst, single LBT priority class information within the UL grant can be commonly applied to the multi-subframes.

Meanwhile, in order to make the base station configure an LBT priority class, the UE can ask the base station to transmit information on an LBT priority class to be scheduled to the UE in advance. If the base station does not configure an LBT priority class, the UE can autonomously configure an LBT priority class for a UL subframe scheduled by the base station.

3.1.2 Method 2

If PUSCH (or PUCCH) transmitted by a UE does not exist immediately before the UE transmits PUSCH (or PUCCH) within a specific UL subframe, the UE performs LBT before the UE transmits the PUSCH within the UL subframe. If the UE succeeds in occupying a channel, the UE starts to transmit a UL signal and configures a (used) UL COT, UL MCOT, and a lowest LBT priority class (for a UL TX burst) as follows.

(1) The UE can configure a (used) UL COT as follows.

1) If an LBT operation follows an LBT priority class set to the specific UL subframe, the UE can configure time ranging from a start point of the UL signal to the end of PUSCH transmission within the UL subframe as the (used) UL COT.

2) If an LBT operation is not related to an LBT priority class set to the specific UL subframe (e.g., fixed LBT or single CCA slot-based LBT), the UE can configure time ranging from a start point of a DL TX burst including a UL grant, which has scheduled PUSCH included in the UL subframe, to the end of PUSCH transmission within the UL subframe as the (used) UL COT. In other word, the UE can configure a time period including DL COT+DTX as the UL COT.

In case of the 2), if a signal is not transmitted during a time period ranging from the start point of the DL TX burst to the start point of the UL signal, the time period can be excluded from the UL COT.

Or, in case of the 2), if the DL TX burst includes UL grants only, the UE can configure a time period ranging from the start point of the UL signal to the end of PUSCH transmission within the UL subframe as the (used) UL COT.

(2) The UE can configure MCOT within an LBT priority class, which is set to a UL subframe in which the PUSCH (or PUCCH) is transmitted, as the UL MCOT.

(3) The UE can configure an LBT priority class set to a UL subframe in which the PUSCH (or PUCCH) is transmitted as a lowest LBT priority class (for a UL TX burst).

When the (used) UL MCOT is configured, it may consider a UL signal including a reservation signal.

The lowest LBT priority class (for the UL TX burst) may indicate that a corresponding UL subframe is included in the UL TX burst only when an LBT priority class set to a following UL subframe has a priority equal to or higher than the lowest LBT priority class.

When an LBT priority class is configured according to a UL subframe scheduled by the base station, the UE performs UL LBT by applying LBT parameters according to an LBT priority class set to a corresponding UL subframe to transmit a first PUSCH (or PUCCH) within a UL TX burst. If the UE succeeds in transmitting the first PUSCH (or PUCCH), the UE can consider the LBT priority class as the lowest LBT priority class of the UL TX burst to be continuously transmitted.

Figure 13:
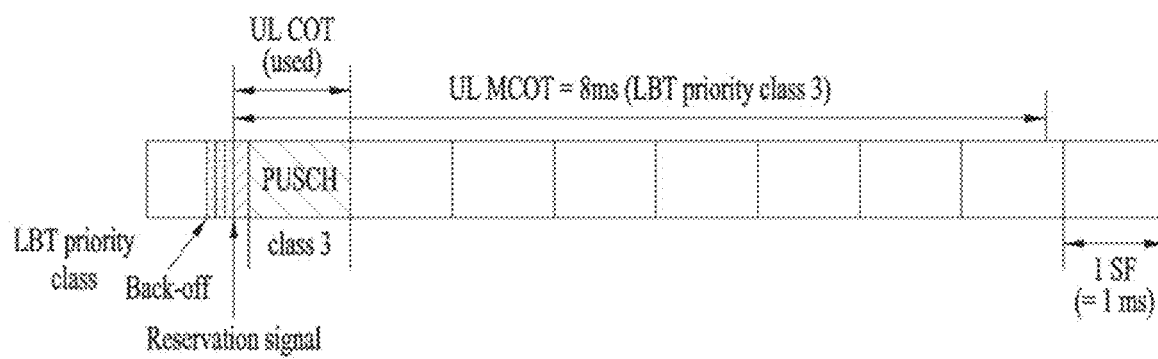
FIG. 13 is a diagram illustrating an example of a UL LBT operation of a UE according to a method 2 of the present invention.

FIG. 13 is a diagram illustrating an example of a UL LBT operation of a UE according to a method 2 of the present invention. As shown in FIG. 13, if there exists PUSCH to be transmitted in a UL subframe to which an LBT priority class 3 is set, a UE can perform UL LBT by applying LBT parameters according to the LBT priority class 3 prior to the UL subframe.

As mentioned in the foregoing description, discussion on a method of utilizing DL MCOT at the time of performing LAA UL transmission is in progress in LTE Rel-14 system. Specifically, when a base station transmits a DL TX burst, if there is a remaining period among a time period corresponding to DL MCOT, a UE may be able to transmit a UL TX burst in the remaining period based on a fixed UL LBT (e.g., single CCA slot-based LBT) operation which is advantageous for accessing a channel compared to a general UL LBT operation. In this case, the UL TX burst inherits DL MCOT and the base station can set the lowest LBT priority class of the DL TX burst to a UL subframe in which the first PUSCH (or PUCCH) is transmitted within the UL TX burst.

In this case, the UE configures the LBT priority class set to the subframe in which the first PUSCH (or PUCCH) is transmitted within the UL TX burst as the lowest LBT priority class of the UL TX burst. The UE can perform a fixed UL LBT operation instead of a UL LBT operation corresponding to the lowest LBT priority class. In this case, in order to inform the UE of an operation to be performed by the UE among the UL LBT operation according to the lowest LBT priority class and the fixed UL LBT operation, the base station can indicate the operation via a UL grant or common DCI.

Figure 14:
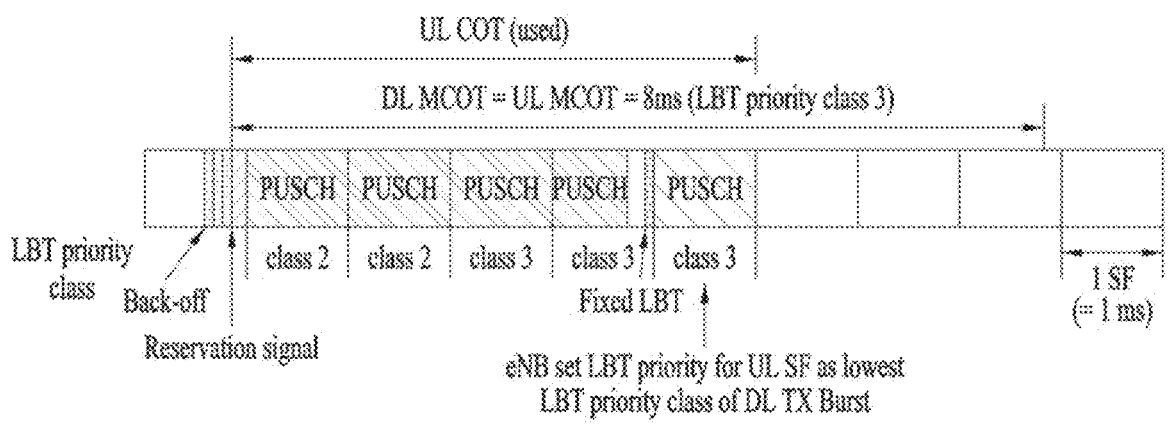
FIG. 14 is a diagram illustrating a different example of a UL LBT operation of a UE according to a method 2 of the present invention.

FIG. 14 is a diagram illustrating a different example of a UL LBT operation of a UE according to a method 2 of the present invention. As shown in FIG. 14, if a UL TX burst borrows DL MCOT, or if the UL TX burst is transmitted within the DL MCOT, a UE performs a fixed LBT (e.g., single CCA slot-based LBT) operation to transmit the UL TX burst.

In this case, if the DL TX burst includes UL grants only, the UE can configure a time period ranging from a start point of a DL TX burst to the end of PUSCH transmission within the UL subframe as UL COT. Or, in order to exclude transmission delay due to UL timing from UL COT, the UE can configure the sum of a length of a reservation signal and a PUSCH transmission length within the UL subframe as the UL COT.

Figure 15:
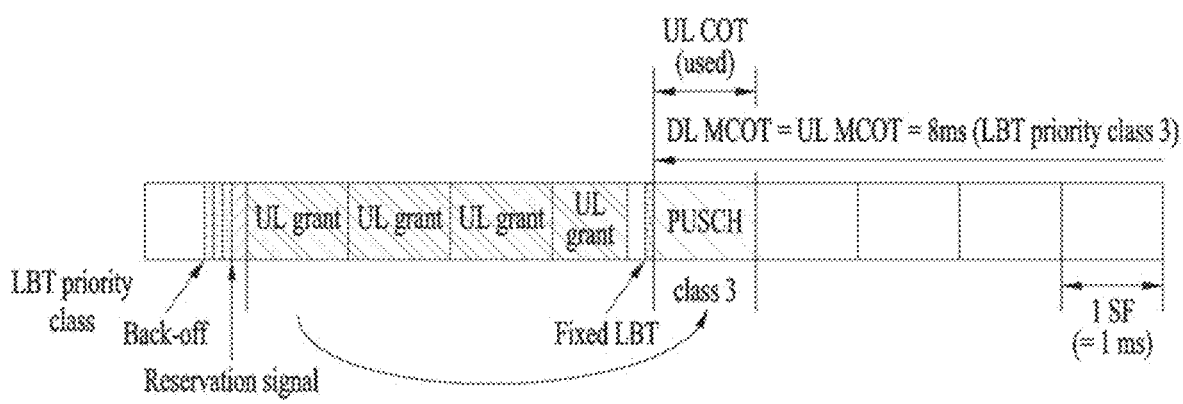
FIG. 15 is a diagram illustrating a further different example of a UL LBT operation of a UE according to a method 2 of the present invention.

FIG. 15 is a diagram illustrating a further different example of a UL LBT operation of a UE according to a method 2 of the present invention. A difference between the FIG. 14 and FIG. 15 is in that COT used for transmitting a UL grant and a period during which a signal is not transmitted until UL signal is transmitted after the UL grant is transmitted are excluded from the UL COT.

In the method 2 proposed in the present invention, if PUSCH (or PUCCH) transmitted by a UE does not exist immediately before PUSCH (or PUCCH) is transmitted in the specific UL subframe, it may indicate that a UL signal to be transmitted in a UL subframe prior to the specific UL subframe does not exist. Or, it may indicate an ending partial TTI while a UL signal to be transmitted in a UL subframe prior to the specific UL subframe exists. Or, it may indicate that a type of a UL signal to be transmitted in the specific subframe corresponds to a starting partial TTI. If a UE performs UL TX burst transmission in a UL subframe to which a LBT priority class is not set within DL MCOT of a previous DL TX burst, the UE may assume that the lowest LBT priority class of the UL TX burst is identical to the lowest LBT priority class of the DL TX burst.

3.2 UL TX Burst Configuration Method of (LBT Priority Class-Based) UE

3.2.1 Method 3

If PUSCH (or PUCCH) transmitted by a UE exists immediately before the UE transmits PUSCH (or PUCCH) within a specific UL subframe, the UE may operate as follows according to a relationship between the lowest LBT priority class (X1) (for a UL TX burst) and an LBT priority class (X2) for the specific UL subframe.

(1) If the LBT priority class set to the UL subframe is equal to or higher than the lowest LBT priority class (for the UL TX burst) (i.e., $X1 \geq X2$), (1)-1) If a length of the sum of the (used) UL COT prior to the UL subframe and a PUSCH (or PUCCH) transmission length within the UL subframe is equal to or less than UL MCOT, the UE performs the PUSCH (or PUCCH) transmission within the UL subframe without LBT and can update the (used) UL COT length with the length of the sum.

(1)-2) If the length of the sum of the (used) UL COT prior to the UL subframe and the PUSCH (or PUCCH) transmission length within the UL subframe is greater than UL MCOT, the UE can perform initialization on the (used) UL COT, the UL MCOT, and the lowest LBT priority class (for the UL TX burst). If PUSCH transmission is omitted in the UL subframe or a starting partial TTI is supported, the UE can perform the operation mentioned earlier in the method 2.

(2) If the LBT priority class set to the UL subframe is lower than the lowest LBT priority class (for the UL TX burst) (i.e., $X1 < X2$), (2)-1) The UE can perform the same operation mentioned earlier in the (1)-2).

More specifically, if the UE succeeds in transmitting a first PUSCH (or PUCCH) of a UL TX burst, the UE can configure UL COT, UL MCOT, and the lowest LBT priority class for the UL TX burst according to the operation mentioned earlier in the method 2. In this case, the UE can include (consecutive) UL subframes having an LBT priority class equal to or higher than the lowest LBT priority class (for the UL TX burst) in the UL TX burst within a range not exceeding the UL MCOT.

For example, when a UE is scheduled to transmit PUSCH (or PUCCH) in an nth UL subframe within a UL TX burst and is scheduled to continuously transmit the PUSCH (or PUCCH) in an (n+1)th UL subframe, the UE may consider two conditions described in the following to determine whether to include the (n+1)th UL subframe in the UL TX burst.

1> When a length of the PUSCH (or PUCCH or UL signal) to be transmitted within the (n+1)th UL subframe is reflected to UL COT, whether or not the total transmission length exceeds UL MCOT 2> Whether a priority of an LBT priority class set to the (n+1)th UL subframe is equal to or greater than the lowest LBT priority class for the UL TX burst If at least one of the two conditions is not satisfied, the UE determines that the UL TX burst is ended. The UE performs initialization on the (used) UL COT for the UL TX burst, UL MCOT, and the lowest LBT priority class (for the UL TX burst) and may be then able to attempt to transmit a new UL TX burst.

Figure 16:
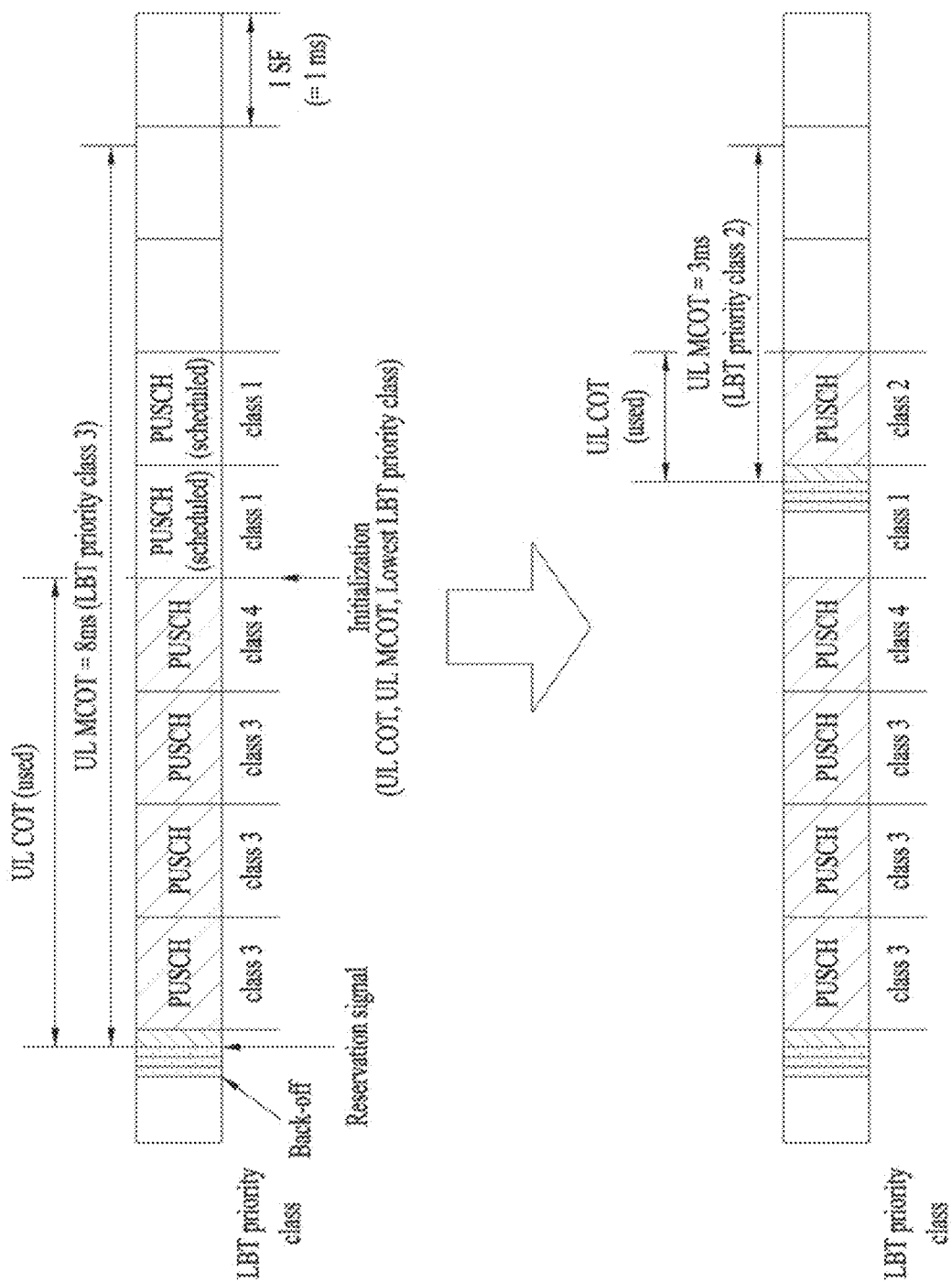
FIG. 16 is a diagram illustrating a UL LBT operation of a UE according to a method 3 of the present invention.

FIG. 16 is a diagram illustrating a UL LBT operation of a UE according to a method 3 of the present invention.

As shown in FIG. 16, when UL subframe transmission corresponds to an LBT priority class of a priority lower than the lowest LBT priority class (for a UL TX burst), a UE does not include the UL subframe transmission in the UL TX burst (e.g., omit PUSCH transmission). As mentioned earlier in the method 2 of the present invention, it may be able to configure a new UL TX burst.

3.2.2 Method 4

A UE transmits PUSCH (or PUCCH) in a specific UL subframe and may be then able to perform one of operations described in the following in a time period not including a UL signal to be transmitted by the UE.

(1) The US performs initialization on (used) UL COT, UL MCOT, and lowest LBT priority class (for UL TX burst).

(2) The UE updates (used) UL COT. If the UL COT reaches UL MCOT, the UE performs initialization.

(2)-1) If (used) UL COT is less than UL MCOT, the UE updates a length of the (used) UL COT by adding a time period not including signal transmission to the (used) UL COT and can maintain the UL MCOT and the lowest LBT priority class (for the UL TX burst).

(2)-2) If (used) UL COT becomes identical to UL MCOT, the UE can perform initialization on the (used) UL COT, the UL MCOT, and the lowest LBT priority class (for UL TX burst).

(3) The UE maintains (used) UL COT, UL MCOT, and lowest LBT priority class (for UL 6 TX burst).

The operation mentioned earlier in the (2) of the method 4 of the present invention can be applied to a case that a length of the time period not including signal transmission is equal to or less than a specific length only.

More specifically, unlike DL transmission, UL transmission depends on scheduling of a base station in LTE system. Hence, it may also consider an operation for terminating UL TX burst of a UE. In particular, if a base station directly indicates a TX gap within a UL subframe, it may be able to terminate a UL TX burst of a UE.

Figure 17:
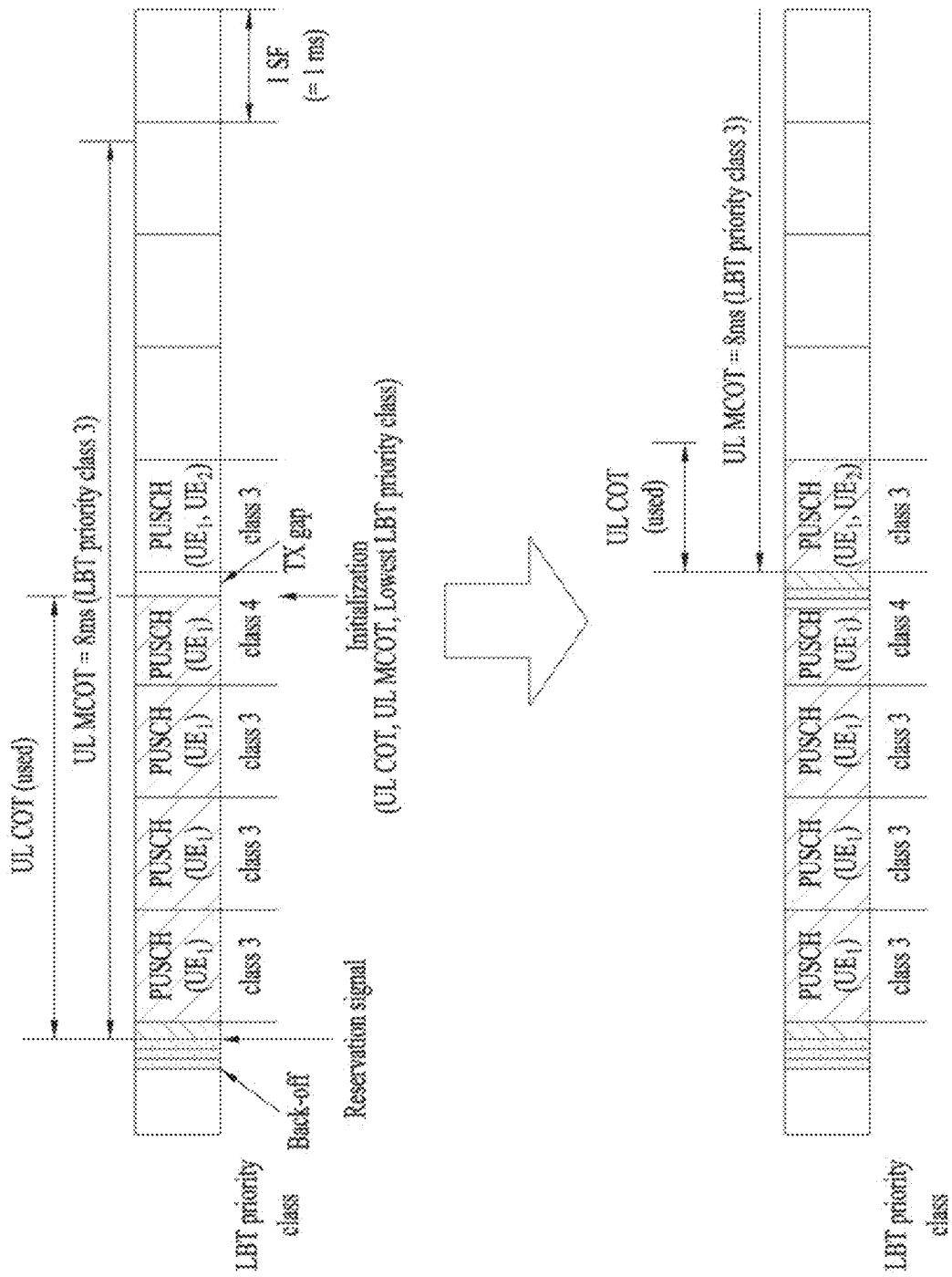
FIG. 17 is a diagram illustrating a UL LBT operation of a UE according to a method 4 of the present invention.

FIG. 17 is a diagram illustrating a UL LBT operation of a UE according to a method 4 of the present invention.

As shown in FIG. 17, although a specific UE (e.g., UE1) has UL traffic to transmit, a base station configures a TX gap to perform FDM (frequency division multiplexing) or MU-MIMO (multi-user input multi output) operation with a different UE (e.g., UE2) in a following UL subframe. By doing so, the base station can terminate a UL TX burst of the specific UE (e.g., UE1) before UL COT reaches UL MCOT.

In this case, when the UE configures the UL TX burst, if the UE is contacted with a time period where signal transmission does not exist, the UE assumes that the UL TX burst is terminated in the time period and may be able to initialize (used) UL COT for the UL TX burst, UL MCOT, and the lowest LBT priority class. Then, the UE performs a new UL LBT operation on a UL TX burst to be transmitted after the timing to which the TX gap is set by the base station. Or, if a UE utilizes a time period corresponding to previously secured UL MCOT for transmitting a next UL TX burst, the UE may not initialize the (used) UL COT, the UL MCOT, and the lowest LBT priority class. Instead, the time period not including signal transmission can be additionally reflected to the (used) UL COT. In particular, although the UE does not perform signal transmission during prescribed time, the UE can perform UL transmission in a time period included in the UL COT without a new LBT.

3.2.3 Method 5

If PUSCH (or PUCCH) transmitted by a UE does not exist immediately before the UE transmits PUSCH (or PUCCH) within a specific UL subframe and specific values are maintained without initializing (used) UL COT, UL MCOT, and the lowest LBT priority class (for a UL TX burst), the UE may operate as follows according to a relationship between the lowest LBT priority class (X1) (for the UL TX burst) and an LBT priority class (X2) for the specific UL subframe. In other word, the method 5 of the present invention can be applied to a case that the UE does not initialize the (used) UL COT, the UL MCOT, and the lowest LBT priority class mentioned earlier in the method 4.

(1) If the LBT priority class set to the UL subframe is equal to or higher than the lowest LBT priority class (for the UL TC burst) (i.e., X1≥X2)

(1)-1) If a length of the sum of the (used) UL COT prior to the UL subframe and a PUSCH (or PUCCH) transmission length within the UL subframe is equal to or less than UL MCOT, the UE attempts to transmit the PUSCH (or PUCCH) within the UL subframe according to a fixed LBT operation and can update the (used) UL COT length with the length of the sum (if the UE succeeds in transmitting the PUSCH (or PUCCH)).

(1)-2) If the length of the sum of the (used) UL COT prior to the UL subframe and the PUSCH (or PUCCH) transmission length within the UL subframe is greater than UL MCOT, the UE can perform initialization on the (used) UL COT, the UL MCOT, and the lowest LBT priority class (for the UL TX burst). Or, the UE may perform the operation mentioned earlier in the method 2.

(2) If the LBT priority class set to the UL subframe is lower than the lowest LBT priority class (for the UL TX burst) (i.e., X1<X2), (2)-1) The UE can perform the same operation mentioned earlier in the (1)-2) of the method 5.

More specifically, as mentioned earlier in the method 4, it may consider a method for a UE to utilize a time period corresponding to previously secured UL MCOT for transmitting a next UL TX burst. As an example of the method, when the UE transmits a new UL TX burst within the remaining UL MCOT period among the time period corresponding to the UL MCOT secured by the UE, the UE can perform a UL LBT operation of which an LBT parameter is mitigated (or a fixed LBT operation or an LBT operation irrespective of an LBT priority class). In this case, the UE can include (consecutive) UL subframes having an LBT priority class equal to or higher than the lowest LBT priority class (for the UL TX burst) in the UL TX burst within a range not exceeding the remaining UL MCOT period for the new UL TX burst.

Figure 18:
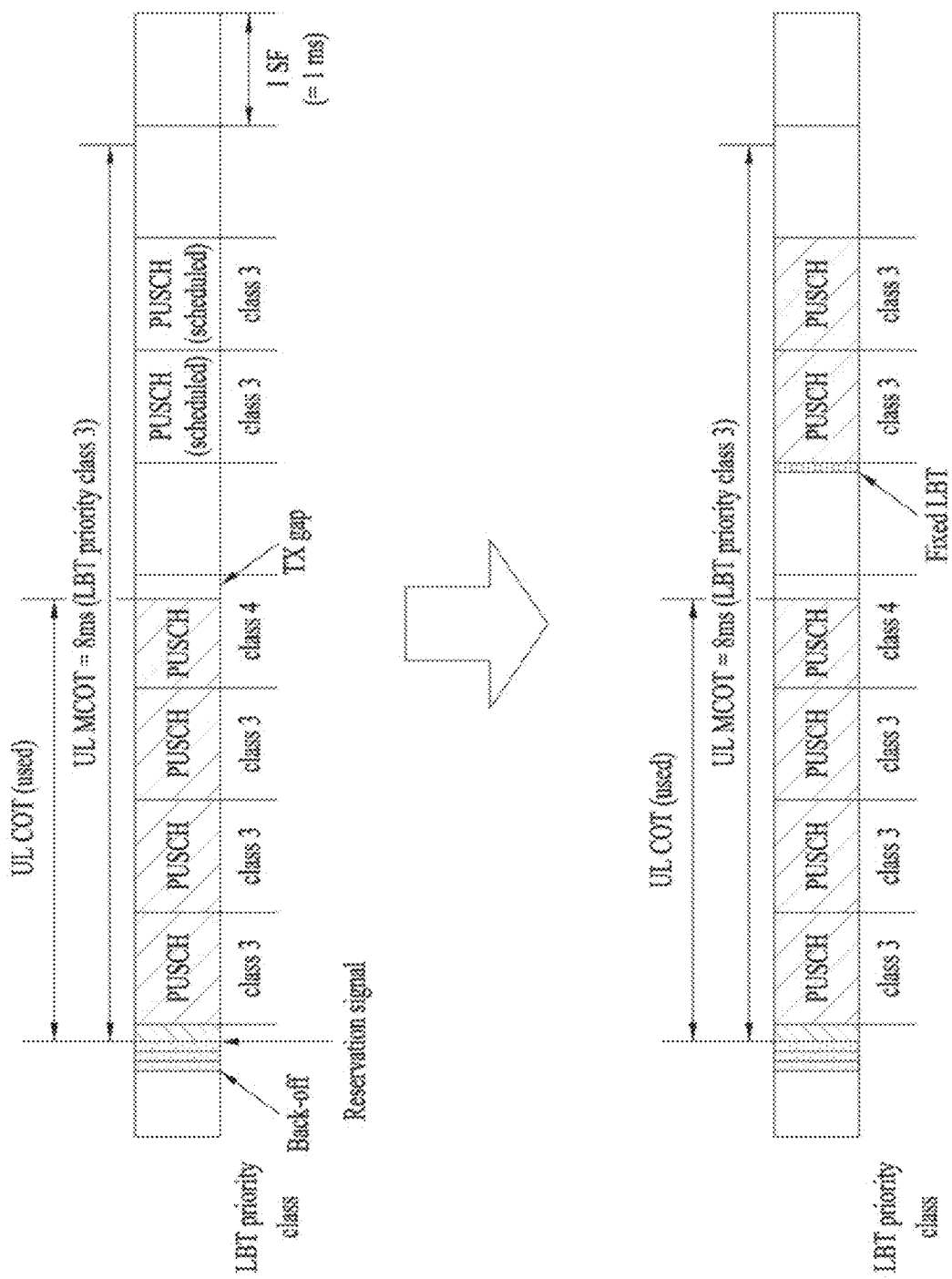
FIG. 18 is a diagram illustrating a UL LBT operation of a UE according to a method 5 of the present invention.

FIG. 18 is a diagram illustrating a UL LBT operation of a UE according to a method 5 of the present invention.

As shown in FIG. 18, a UE can operate according to the aforementioned method 4. In this case, if PUSCH (or PUCCH) transmitted by the UE does not exist immediately before PUSCH (or PUCCH) is transmitted in the specific UL subframe, it may indicate that a UL signal to be transmitted in a UL subframe prior to the specific UL subframe does not exist. Or, it may indicate an ending partial TTI while a UL signal to be transmitted in a UL subframe prior to the specific UL subframe exists. Or, it may indicate that a type of a UL signal to be transmitted in the specific subframe corresponds to a starting partial TTI.

3.2.4 Method 6

When a base station transmits a UL grant within a time period corresponding to DL MCOT of a previously transmitted DL TX burst, if a transmission signal of the base station does not exist before the UL grant is transmitted, the base station can transmit the UL grant according to a fixed LBT operation (or an LBT operation irrespective of an LBT priority class).

As mentioned in the foregoing description, discussion on a method of utilizing DL MCOT for performing LAA UL transmission is in progress in LTE-Rel-14 system. In this case, it may consider a method of utilizing DL COT not only for transmitting a UL TX burst but also for transmitting a UL grant. In particular, a base station can transmit a UL grant based on a fixed DL LBT (e.g., single CCA slot-based LBT) operation which is advantageous for accessing a channel compared to a general UL LBT operation in the remaining period remained after a DM TX burst is transmitted among a time period corresponding to the DL MCOT.

Figure 19:
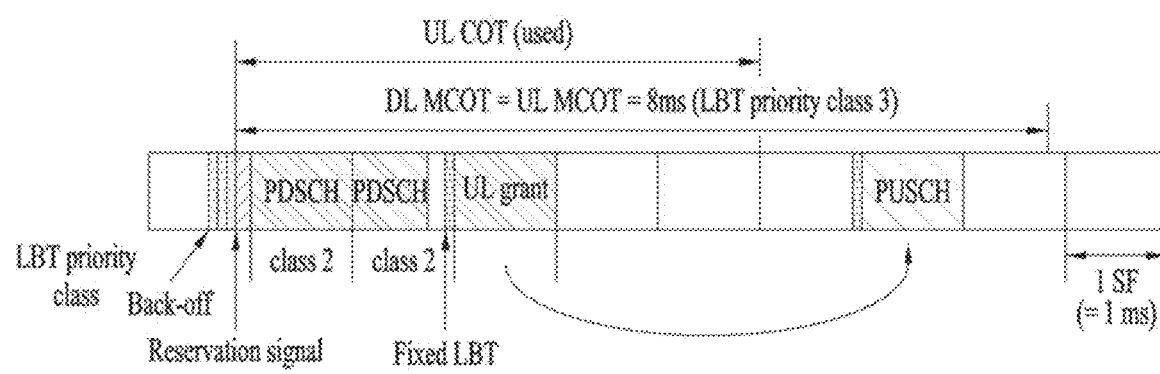
FIG. 19 is a diagram illustrating a UL LBT operation of a UE according to a method 6 of the present invention.

FIG. 19 is a diagram illustrating a UL LBT operation of a UE according to a method 6 of the present invention.

As shown in FIG. 19, a base station performs a fixed LBT to transmit a UL grant within DL MCOT and may be then able to transmit the UL grant.

3.3 UL TX Burst Configuration Method of (LBT Parameter and TX Gap Information-Based) UE 3.3.1 Method 7

If a base station informs a UE of whether to apply an LBT parameter (e.g., CWS, backoff counter, etc.) and a TX gap according to a scheduled UL subframe, the UE can configure a UL TX burst as follows.

(1) If PUSCH (or PUCCH) transmitted by a UE does not exist immediately before the UE transmits PUSCH (or PUCCH) within a specific UL subframe, the UE can perform an LBT parameter-based LBT operation set to the UL subframe prior to the UL subframe.

(2) If PUSCH (or PUCCH) transmitted by a UE exists immediately before the UE transmits PUSCH (or PUCCH) within a specific UL subframe, the UE can perform PUSCH (or PUCCH) transmission in the specific subframe without an LBT operation.

(3) If a UE has no UL signal to transmit (e.g., empty SF or TX gap), the UE stops configuring a current UL TX burst and may be able to configure a new UL TX burst. In this case, a TX gap can be applied to timing indicated by a base station only.

In this case, when a UL TX burst is transmitted based on a specific LBT parameter, a base station may set a limit on scheduling in order not to permit a case that a length of the UL TX burst is to be longer than UL MCOT for the specific LBT parameter.

More specifically, when the base station controls the UL MCOT in the aspect of scheduling, if the base station transmits an indication on an LBT parameter according to a UL subframe and indication on a TX gap to the UE, the UE can configure a UL TX burst via the indication information. In this case, it is not necessary for the UE to consider a case that UL MCOT of the UE exceeds UL MCOT.

Figure 20:
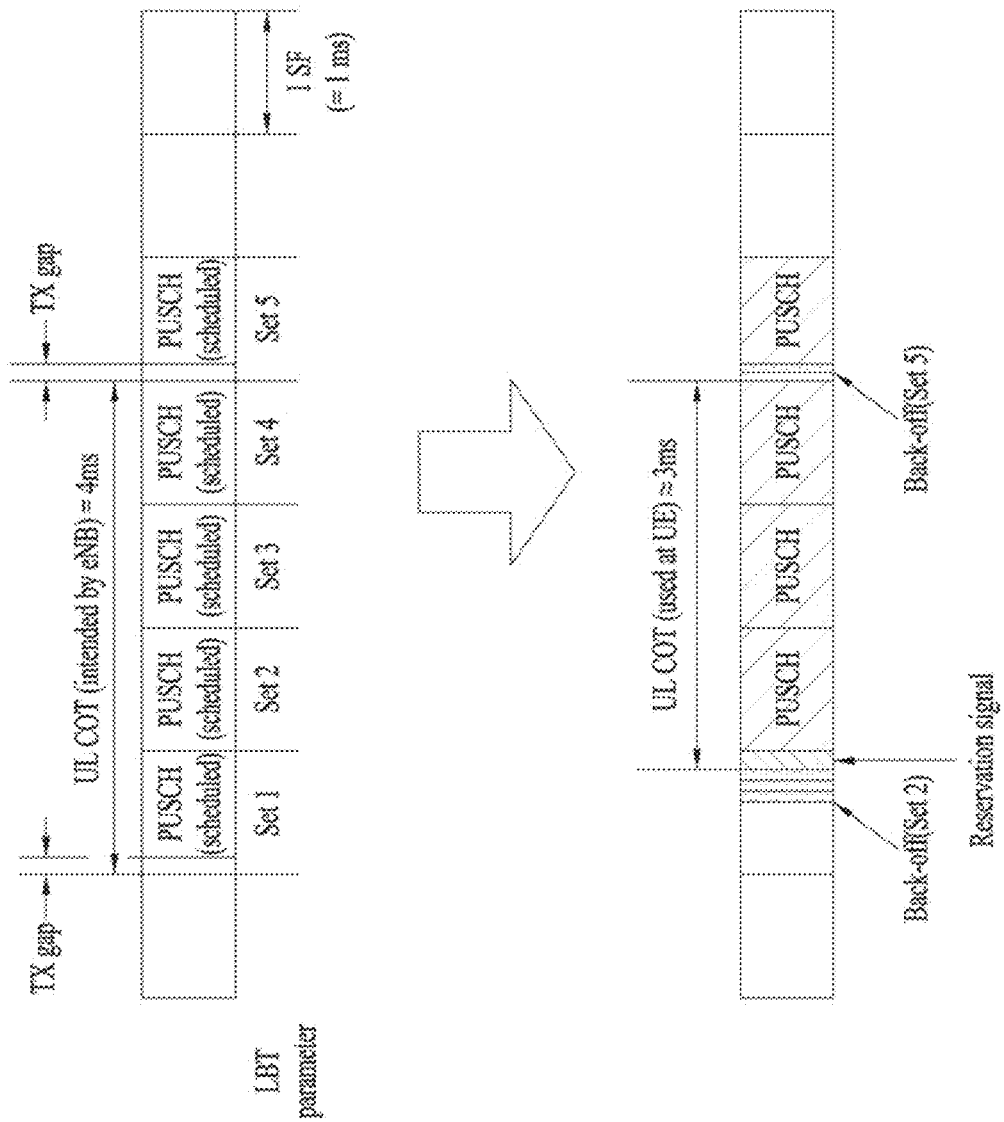
FIG. 20 is a diagram illustrating a UL LBT operation of a UE according to a method 7 of the present invention.

FIG. 20 is a diagram illustrating a UL LBT operation of a UE according to a method 7 of the present invention.

Figure 21:
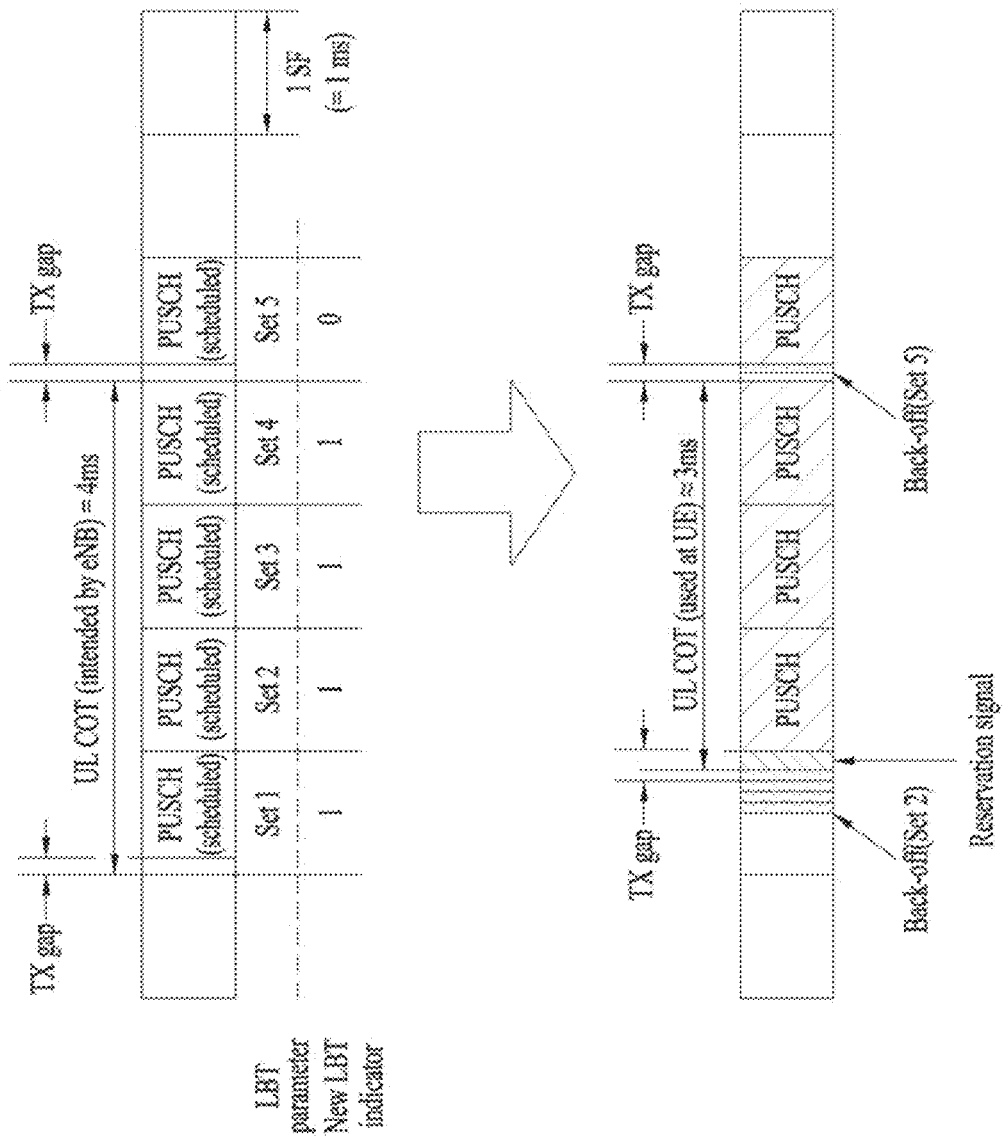
FIG. 21 is a diagram illustrating a UL LBT operation of a UE according to a method 8 of the present invention.

More specifically, when a base station schedules 4 consecutive UL subframes and 1 UL subframe including a Tx gap at a fore part appearing immediately after the 4 consecutive UL subframes in time domain and a UE fails to detect a UL grant for a first UL subframe among the 4 consecutive UL subframes, FIG. 21 illustrates an operation of the UE.

As illustrated in FIG. 20, the UE starts to transmit a UL TX burst according to the (1) of the method 7 prior to a second UL subframe among the 4 consecutive UL subframes and can configure a UL TX burst including 3 consecutive UL subframes according to the (2) of the method 7. However, since a TX gap is positioned at the fore part of a 5th scheduled UL subframe, the UE stops configuring a previously configured UL TX burst according to the (3) of the method 7 and may be then able to attempt to transmit a new UL TX burst.

3.3.2 Method 8

If a base station informs a UE of an LBT parameter (e.g., CWS, backoff counter, etc.) according to a scheduled UL subframe and information on whether to perform a new LBT, the UE can configure a UL TX burst as follows.

(1) If PUSCH (or PUCCH) transmitted by a UE does not exist immediately before the UE transmits PUSCH (or PUCCH) within a specific UL subframe, the UE can perform an LBT parameter-based LBT operation set to the UL subframe prior to the UL subframe. In this case, the UE may assume that a TX gap is applied to the fore part of the UL subframe (or a rear part of a UL subframe immediately before the UL subframe).

(2) If PUSCH (or PUCCH) transmitted by a UE exists immediately before the UE transmits PUSCH (or PUCCH) within a specific UL subframe, the UE can transmit PUSCH (or PUCCH) in the specific subframe without an LBT operation.

(3) If a UE has no UL signal to transmit or a new LBT performance indication indicates that a new UL TX burst starts, the UE stops configuring a current UL TX burst and may be able to configure a new UL TX burst.

In this case, when a base station configures an LBT parameter for a specific UL subframe, it may be able to set a limit on UL scheduling to prevent a UE from performing UL transmission more than UL MCOT corresponding to the LBT parameter.

More specifically, similar to the aforementioned method 7, when the base station controls the UL MCOT in the aspect of scheduling, if the base station transmits an indication on an LBT parameter according to a UL subframe and indication on whether to perform a new LBT to the UE, the UE can configure a UL TX burst via the indication information.

In this case, a TX gap can be applied to the timing at which a new LBT is to be performed (e.g., a fore part of time domain of a first UL subframe within the UL TX burst or a rear part of time domain of a UL subframe immediately before the first UL subframe). The timing may correspond to a position promised between the base station and the UE (e.g., a fore part of time domain of a first UL subframe within the UL TX burst).

Or, a TX gap indication of the base station may indicate the performance of a new LBT. As an example of indicating whether or not the new LBT is performed, it may apply a scheme that the base station toggles 1 bit information included in a UL grant (or common DCI) at the timing at which a new UL TX burst starts. Or, the base station indicates '1' for a subframe in which new LBT is to be performed and indicates '0' for a subframe in which whether to perform LBT is determined by the UE using the 1 bit information.

FIG. 21 is a diagram illustrating a UL LBT operation of a UE according to a method 8 of the present invention.

More specifically, when a base station schedules 4 consecutive UL subframes and 1 UL subframe including a TX gap at a fore part appearing immediately after the 4 consecutive UL subframes in time domain and a UE fails to detect a UL grant for a first UL subframe among the 4 consecutive UL subframes, FIG. 21 illustrates an operation of the UE.

As illustrated in FIG. 21, if a UE fails to detect a UL grant for a first UL subframe among the 4 consecutive UL subframes, the UE may apply a TX gap to the fore part of a second UL subframe. Subsequently, the UE transmits PUSCH in the second subframe to a fourth UL subframe and may be able to transmit PUSCH by applying a separate TX gap to a fifth subframe and performing LBT.

3.3.3 Method 9

If a base station informs a UE of an LBT parameter (e.g., CWS, backoff counter, etc.) according to a scheduled UL subframe, information on whether or not a TX gap is applied, and information on UL MCOT, the UE can configure a UL TX burst as follows.

(1) If PUSCH (or PUCCH) transmitted by a UE does not exist immediately before the UE transmits PUSCH (or PUCCH) within a specific UL subframe, the UE can perform an LBT parameter-based LBT operation set to the UL subframe prior to the UL subframe.

(2) If PUSCH (or PUCCH) transmitted by a UE exists immediately before the UE transmits PUSCH (or PUCCH) within a specific UL subframe, the UE can transmit PUSCH (or PUCCH) in the specific subframe without an LBT operation under the condition of not exceeding UL MCOT.

(3) If a UE has no UL signal to transmit or UL MCOT is all utilized, the UE stops configuring a current UL TX burst and may be able to configure a new UL TX burst. In this case, the UE can selectively apply a TX gap indicated by a base station. In other word, the UE may not apply the TX gap within the UL MCOT.

In FIGS. 20 and 21, if an LBT parameter corresponding to Set 2 is able to support UL MCOT 4 ms, a UE may be able to configure a UL TX burst by utilizing the UL MCOT as much as possible.

Or, when a base station indicates a UE to apply a TX gap in a specific UL subframe, if the UE determines that it is not necessary for the UE to apply the TX gap because the UL subframe is fully included in UL MCOT, the UE may not apply the TX gap. In particular, whether to apply the TX gap can be determined by the UE.

Figure 22:
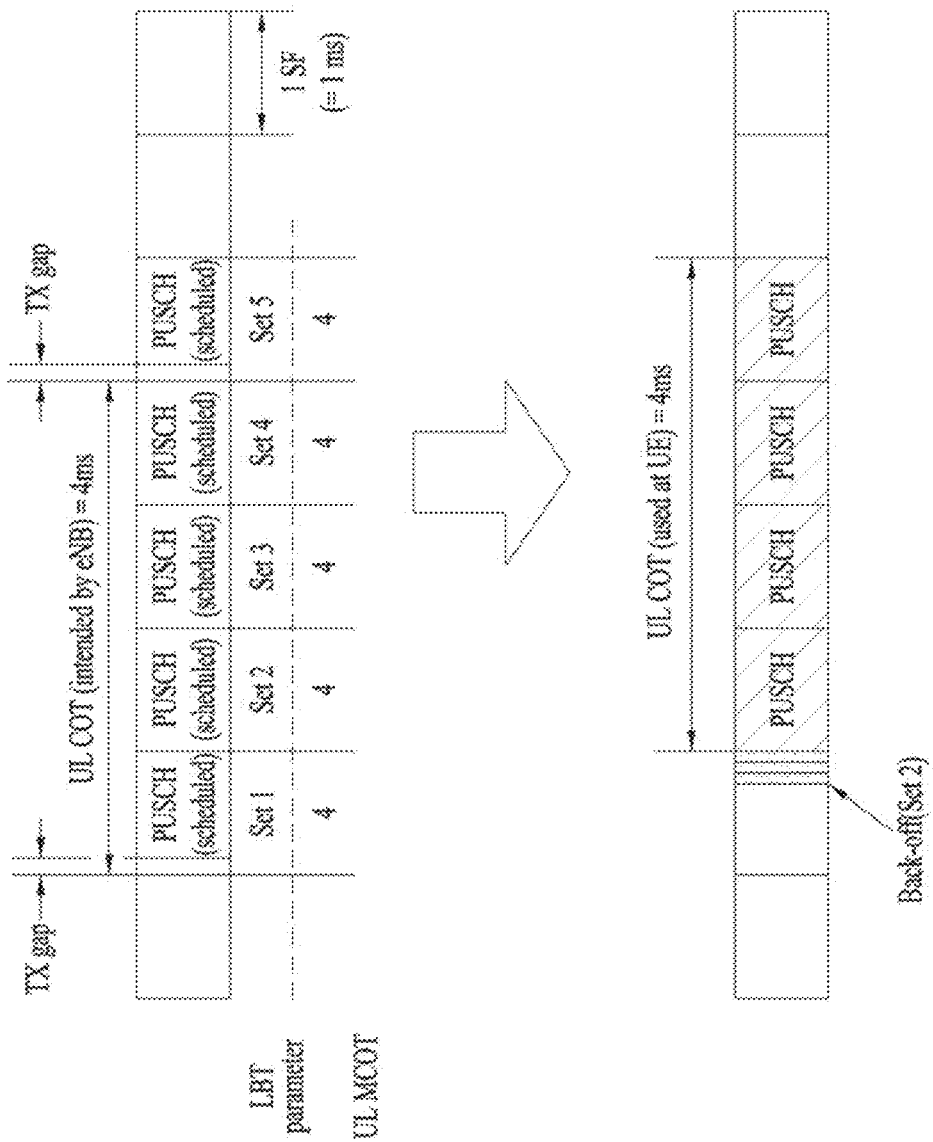
FIG. 22 is a diagram illustrating a UL LBT operation of a UE according to a method 9 of the present invention.

FIG. 22 is a diagram illustrating a UL LBT operation of a UE according to a method 9 of the present invention.

FIG. 22 illustrates an example of a method 9. When a base station schedules 4 consecutive UL subframes and 1 UL subframe including a TX gap at a fore part appearing immediately after the 4 consecutive UL subframes in time domain and a UE fails to detect a UL grant for a first UL subframe among the 4 consecutive UL subframes, FIG. 22 illustrates an operation of the UE.

As shown in FIG. 22, if a UE fails to detect a UL grant for a first UL subframe, the UE can continuously transmit PUSCH in a second to fifth UL subframes without applying any separate TX gap.

As a variation of the method 9 of the present invention, when a UE configures a UL TX burst based on an LBT parameter (e.g., CWS, backoff counter, etc.) according to a UL subframe, information on whether or not a TX gap is applied, and information on UL MCOT indicated by a base station, the UE may always follow an indication of the base station to determine whether or not a TX gap is applied in a UL subframe while performing the operations of (1) and (2) of the method 9. In particular, it may consider a method of combining (1) and (2) of the method 9 with (3) of the method 7.

3.3.4 Method 10

If a base station informs a UE of an LBT parameter (e.g., CWS, backoff counter, etc.) according to a scheduled UL subframe and information on UL MCOT, the UE can configure a UL TX burst as follows.

(1) If PUSCH (or PUCCH) transmitted by a UE does not exist immediately before the UE transmits PUSCH (or PUCCH) within a specific UL subframe, the UE can perform an LBT operation prior to the UL subframe. In this case, the UE may assume that a TX gap is applied to the fore part of the UL subframe (or a rear part of a UL subframe immediately before the UL subframe)

(2) If PUSCH (or PUCCH) transmitted by a UE exists immediately before the UE transmits PUSCH (or PUCCH) within a specific UL subframe, the UE can transmit PUSCH (or PUCCH) in the specific subframe without an LBT operation under the condition of not exceeding UL MCOT.

More specifically, as a variation according to the combination of the method 8 and the method 9, it may indicate the LBT parameter according to a UL subframe and the UL MCOT information only and it may not indicate information on whether or not a TX gap is applied.

In this case, the UE may assume that a TX gap is applied to the fore part of the UL subframe in which a first PUSCH (or PUCCH) of a UL TX burst is transmitted or a rear part of a UL subframe immediately before the UL subframe.

Figure 23:
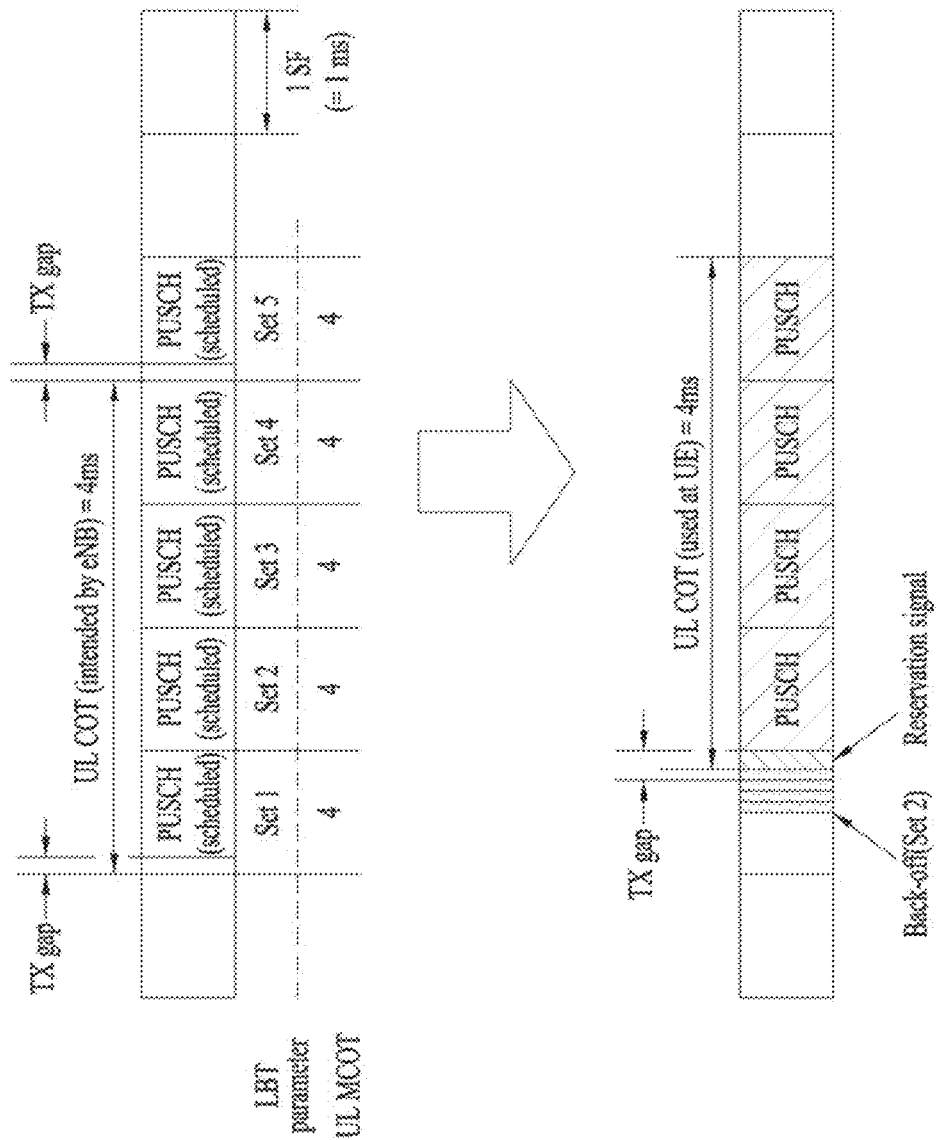
FIG. 23 is a diagram illustrating a UL LBT operation of a UE according to a method 10 of the present invention.

FIG. 23 is a diagram illustrating a UL LBT operation of a UE according to a method 10 of the present invention.

More specifically, when a base station schedules 4 consecutive UL subframes and 1 UL subframe including a TX gap at a fore part appearing immediately after the 4 consecutive UL subframes in time domain and a UE fails to detect a UL grant for a first UL subframe among the 4 consecutive UL subframes, FIG. 23 illustrates an operation of the UE.

As illustrated in FIG. 23, if a UE fails to detect a UL grant for a first UL subframe among the 4 consecutive UL subframes, the UE may apply a TX gap to the fore part of a second UL subframe. Subsequently, the UE may continuously transmit PUSCH in the second subframe to a fifth UL subframes.

3.3.5 Method 11

When a base station indicates an LBT parameter set A to a specific UL subframe, if PUSCH (or PUCCH) transmitted by a UE does not exist immediately before the UE transmits PUSCH (or PUCCH) within the specific UL subframe, the UE can perform UL LBT as follows before the PUSCH (PUCCH) is transmitted within the UL subframe.

(1) If the UE does not perform UL LBT, the UE can perform UL LBT based on the LBT parameter set A set to the specific UL subframe.

(2) If the UE performs UL LBT based on an LBT parameter set B, it may select one from among options described in the following.

(2)-1) The UE can continuously perform the currently operating UL LBT operation.

(2)-2) If the set B is different from the set A, the UE can perform UL LBT based on the set A. Otherwise, the UE can continuously perform the currently operating UL LBT operation.

(2)-3) If the set A has longer UL MCOT, a bigger backoff counter (or CCA section), or a bigger CW size compared to the set B, the UE can perform UL LBT based on the set A. Otherwise, the UE can continuously perform the currently operating UL LBT operation.

(2)-4) If the set A has less remaining backoff counters (or CCA section) compared to the set B, the UE can perform UL LBT based on the set A. Otherwise, the UE can continuously perform the currently operating UL LBT operation.

In this case, when the UE intends to perform UL LBT based on an LBT parameter set to a specific UL subframe, the UL LBT can be performed after previous UL LBT operations are initialized when PUSCH (PUCCH) transmission fails in a previous UL subframe.

Figure 24:
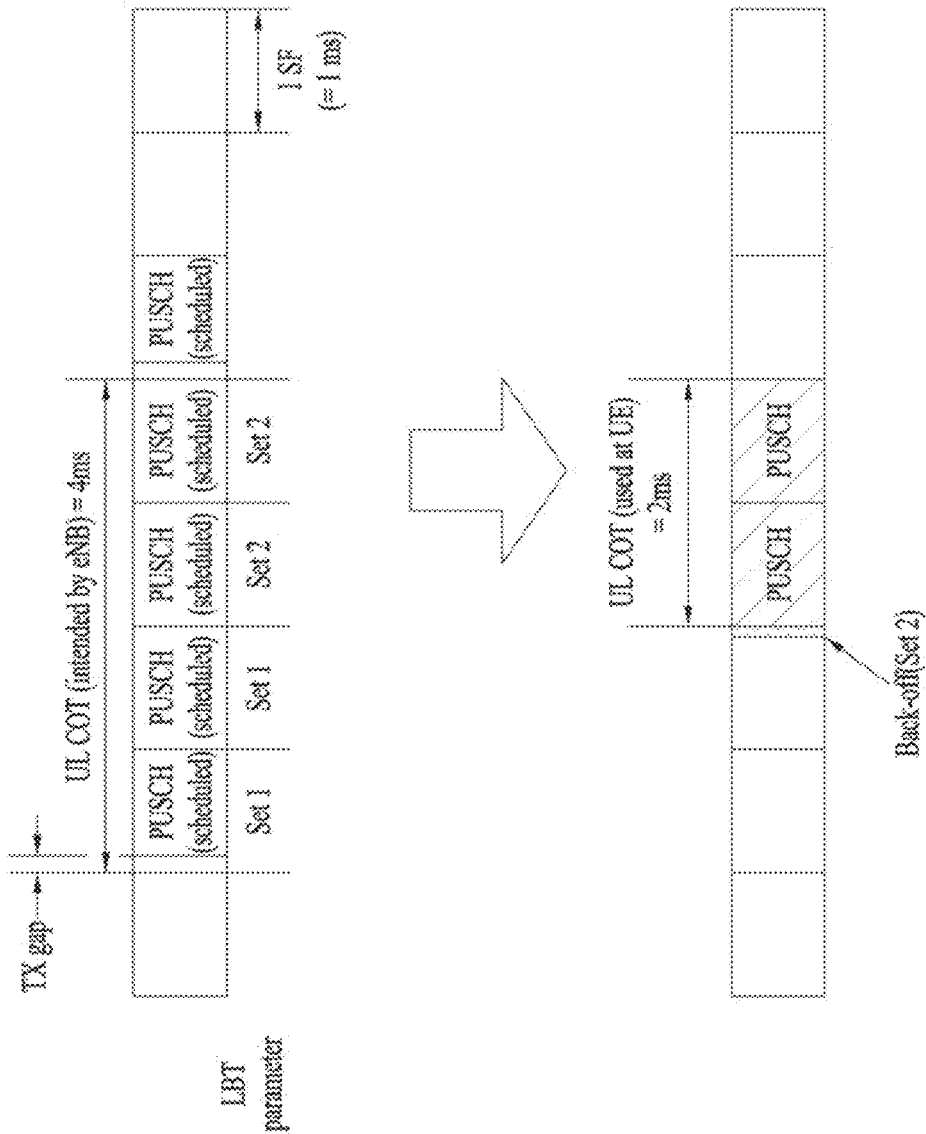
FIG. 24 is a diagram illustrating an example of a UL LBT operation of a UE according to a method 11 of the present invention.

FIG. 24 is a diagram illustrating an example of a UL LBT operation of a UE according to a method 11 of the present invention.

In FIG. 24, assume that an LBT parameter set 1 supports 4 ms UL MCOT, an LBT parameter set 2 supports 2 ms UL MCOT, and a CCS section required by the set 2 is shorter than a CCA section required by the set 1. In this case, a base station can sequentially configure set 1/set 1/set 2/set 2 according to a UL subframe while scheduling 4 consecutive UL subframes.

As shown in FIG. 24, if a UE fails to detect a UL grant from the first 2 UL subframes, the UE can perform UL LBT based on a set 2 LBT parameter set to the third UL subframe according to the (1) of the method 11. The operation above is useful in that it is able to use UL LBT requiring less CCA section in accordance with the UL COT 2 ms to be actually transmitted by the UE.

Figure 25:
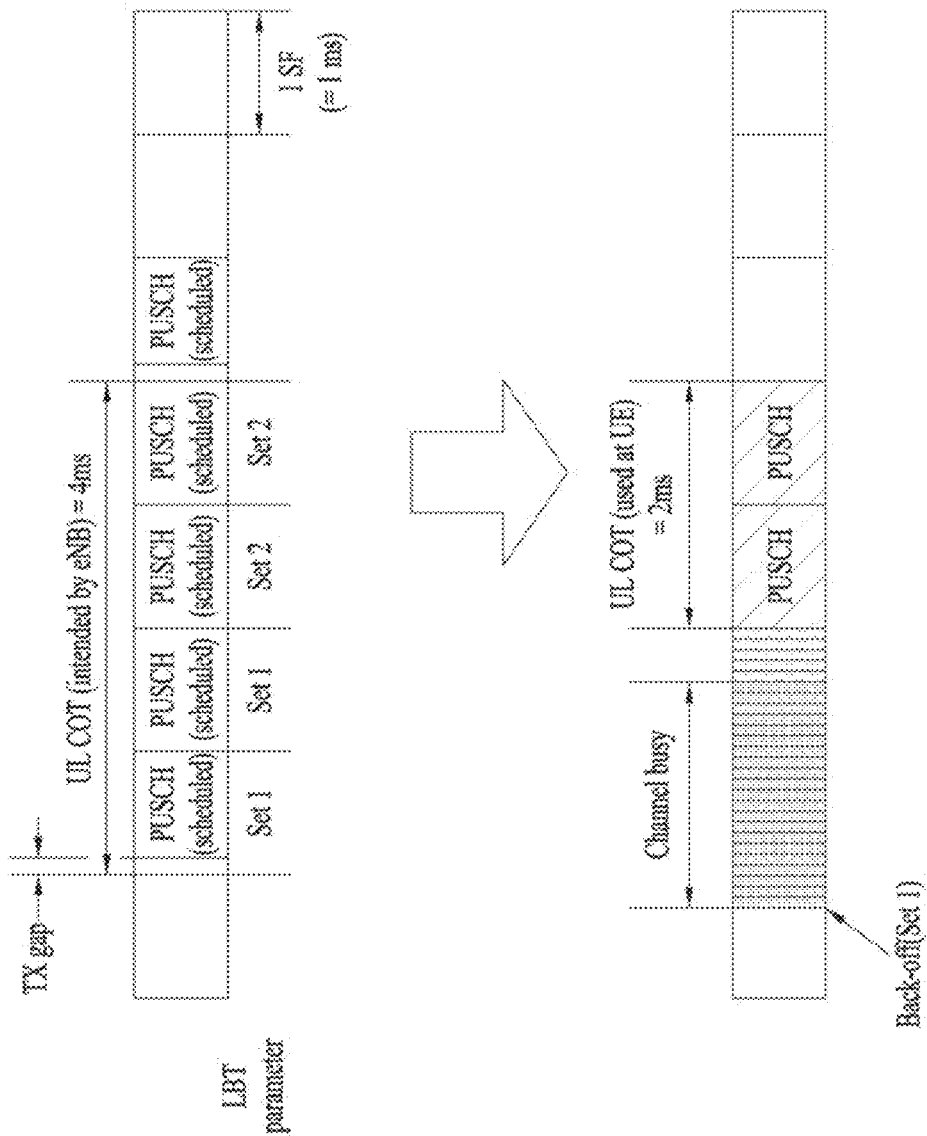
FIG. 25 is a diagram illustrating a different example of a UL LBT operation of a UE according to a method 11 of the present invention.

FIG. 25 is a diagram illustrating a different example of a UL LBT operation of a UE according to a method 11 of the present invention.

When the UE performs UL LBT according to the set 1 prior to the first UL subframe, if the UE fails to transmit PUSCH (or PUCCH) in the first UL subframe and the second UL subframe, as shown in FIG. 25, the UE can transmit PUSCH (PUCCH) in the third UL subframe using the previously performed set 1-based UL LBT according to the (2)-1) of the method 11 without using the set 2 set to the third UL subframe.

3.3.6 Method 12

A base station indicates an LBT parameter set A for a specific UL subframe and a timing capable of applying the LBT parameter set A for the specific UL subframe can be configured by a timing appearing before a start timing (or a start timing of PUSCH transmission within the UL subframe) of the specific UL subframe as much as TLBT.

In this case, a base station can set the TLTB to a UE using one of methods described in the following.

(1) The base station sets a TLTB value to the UE via higher layer signaling.

(2) The base station sets a plurality of TLTB values to the UE via higher layer signaling, selects a TLTB value from among a plurality of the TLTB values via a UL grant (or common DCI), and can indicate the selected TLTB value to the UE.

(3) The base station can indicate a TLTB value via a UL grant (or common DCI).

(4) A TLTB can be defined by a predetermined value.

Additionally, it may be able to set a limit on the UE to make the UE perform UL LBT for the specific UL subframe within a time period ranging from the timing to which the LBT parameter set A is applicable to the start of a UL signal in the UL subframe only.

In this case, the TLBT can be configured to have a length shorter than a length of a single SF.

For example, the base station can configure the UE to start an UL LBT operation for the specific UL subframe from a timing appearing prior to the start timing of the specific UL subframe as much as one symbol. In this case, the UE can apply an LBT parameter set indicated by the base station to the specific UL subframe. If the UE fails to transmit PUSCH in the specific UL subframe, the UE can initialize a UL LBT operation from the timing at which the PUSCH transmission fails. When an LBT parameter set is indicated to a specific UL subframe, the base station is able to set a time period capable of performing a UL LBT operation using the LBT parameter set to the UE. In this case, the LBT parameter set-based UL LBT operation set to the specific UL subframe can be performed until a UL signal is transmitted in the UL subframe. If a separate ending timing is not determined, the LBT parameter set-based UL LBT operation can be performed for a UL signal to be transmitted later.

3.3.7 Method 13

When a base station indicates an LBT parameter set A and a timing at which the LBT parameter set A is applicable for a specific UL subframe, if there is a separate UL LBT operation performed until the timing at the timing at which the LBT parameter set A is applicable, a UE subtracts the number of currently accumulated idle CCA slots and may be able to perform an LBT parameter set A-based UL LBT operation.

For example, when an LBT parameter set A for a specific UL subframe is applied, assume that there is a UL LBT previously performed until the timing to which the LBT parameter set A is applied and 10 idle CCA slots are examined in the previous UL LBT procedure. In this case, if a backoff counter value according to the LBT parameter set A corresponds to 16, a UE can reflect the examined 10 idle CCA slots to the backoff counter value. In particular, the UE can perform an LBT parameter set A-based UL LBT operation with a backoff counter value of 6 (=16-10).

If the number of idle CCA slots examined in a previous UL LBT procedure is greater than the backoff counter value of the LBT parameter set A, the UE assumes that the backoff counter value corresponds to 0 and may be able to immediately transmit a reservation signal. Or, the UE can performs a self-defer operation to maintain the backoff counter value by 0 while continuously examining idle CCA slots until the timing at which PUSCH transmission starts within the specific UL subframe. In this case, if a busy CCA slot is examined in the middle of performing the self-defer operation, the UE may resume the LBT parameter set A-based UL LBT operation.

3.3.8 Method 14

A UE selects an LBT parameter corresponding to a length of a UL TX burst (or an MCOT value including the length of the UL TX burst) to be transmitted by the UE and may be able to perform an UL LBT operation by applying the selected LBT parameter.

In this case, if a base station indicates an LBT parameter to transmit the UL TX burst, the UE performs an LBT parameter-based UL LBT according to the indication of the base station. If the UE fails to perform UL transmission, the UE can perform the operation mentioned earlier in the method 14.

For example, when a base station indicates a UE to transmit a UL TX burst, the base station can inform the UE of an LPT parameter for transmitting the UL TX burst. In this case, although the UE has performed the LBT parameter-based UL LBT indicated by the base station, the UE assumes that the UE has failed to transmit UL subframes positioned at the fore part of the UL TX burst.

In this case, in the aspect of the UE, the LBT parameter indicated by the base station may correspond to an LBT parameter requiring excessive backoff operations compared to a length of the remaining UL TX burst.

More specifically, assume that a base station indicates a UE to transmit a UL TX burst including 8 UL subframes and indicates an LBT parameter corresponding to transmission of the 8 UL subframes to the UE. In this case, if the UE fails to transmit the first 4 UL subframes and a length of the remaining UL TX burst corresponds to 4 UL subframes, in the aspect of the UE, it is preferable to apply an LBT parameter corresponding to the length of the 4 UL subframes.

In particular, if a UE fails to start transmission with an LBT parameter-based UL LBT operation indicated by a base station for a specific UL TX burst, the present invention proposes a method for the UE to select an LBT parameter corresponding to a length of a (remaining) UL TX burst (or an MCOT value including the length of the UL TX burst) to be transmitted and apply the selected LBT parameter to a UL LBT operation.

In particular, the present invention proposes various methods for a UE to transmit an uplink signal to a base station in a wireless communication system supporting an unlicensed band.

According to an example of a method among the various methods, a UE receives a signal for scheduling uplink transmission in an Nth subframe (N is a natural number) from a base station. If there is a currently performed first LBT prior to the Nth subframe, the UE may continuously perform the first LBT (listen-before-talk) based on a specific condition. Or, the UE performs a second LBT indicated to the Nth subframe and performs uplink transmission based on a result of the performed LBT.

In this case, the signal for scheduling the uplink transmission in the Nth subframe can include information (e.g., LBT parameter information on the second LBT) indicating the second LBT for the Nth subframe.

The specific condition indicates whether or not a first parameter for the first LBT is different from a second LBT parameter for the second LBT. If the first parameter for the first LBT is different from the second LBT parameter for the second LBT, the UE performs the second LBT. If the first parameter for the first LBT is identical to the second LBT parameter for the second LBT, the UE can continuously perform the currently performed first LBT. In particular, the UE can perform uplink transmission based on a result of each of the LBTs performed by the UE.

Or, the specific condition may indicate whether or not the first parameter for the first LBT has a contention window size greater than a contention window size of the second LBT parameter for the second LBT. In this case, if the first parameter for the first LBT does not have a contention window size greater than a contention window size of the second LBT parameter for the second LBT, the UE performs the second LBT. If the first parameter for the first LBT has a contention window size greater than a contention window size of the second LBT parameter for the second LBT, the UE can continuously perform the currently performed first LBT. In particular, the UE can perform uplink transmission based on a result of each of the LBTs performed by the UE.

Or, the specific condition may indicate whether or not a channel access priority class of the first parameter for the first LBT is equal to or greater than a channel access priority class of the second LBT parameter for the second LBT. In this case, if the channel access priority class of the first parameter for the first LBT is equal to or greater than the channel access priority class of the second LBT parameter for the second LBT, the UE can continuously perform the currently performed first LBT. If the channel access priority class of the first parameter for the first LBT is less than the channel access priority class of the second LBT parameter for the second LBT, the UE terminates the first LBT and can perform the second LBT. In particular, the UE can perform uplink transmission based on a result of each of the LBTs performed by the UE.

In this case, if a first channel access priority class is greater than a second channel access priority class, it may indicate that a priority for the first channel access priority class is lower than a priority for the second channel access priority class.

Or, the specific condition may indicate whether or not a remaining backoff counter value for the first LBT is equal to or less than a backoff counter value of the second LBT parameter for the second LBT. In this case, if the remaining backoff counter value for the first LBT is equal to or less than the backoff counter value of the second LBT parameter for the second LBT, the UE can continuously perform the currently performed first LBT. If the remaining backoff counter value for the first LBT is greater than the backoff counter value of the second LBT parameter for the second LBT, the UE can perform the second LBT. In particular, the UE can perform uplink transmission based on a result of each of the LBTs performed by the UE.

In this case, when the UE performs the second LBT, it may comprise that the UE initializes the first LBT operation and performs the second LBT.

In addition, if uplink transmission is performed in a subframe before the Nth subframe, the UE may perform uplink transmission in the Nth subframe without an LBT operation.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 26:
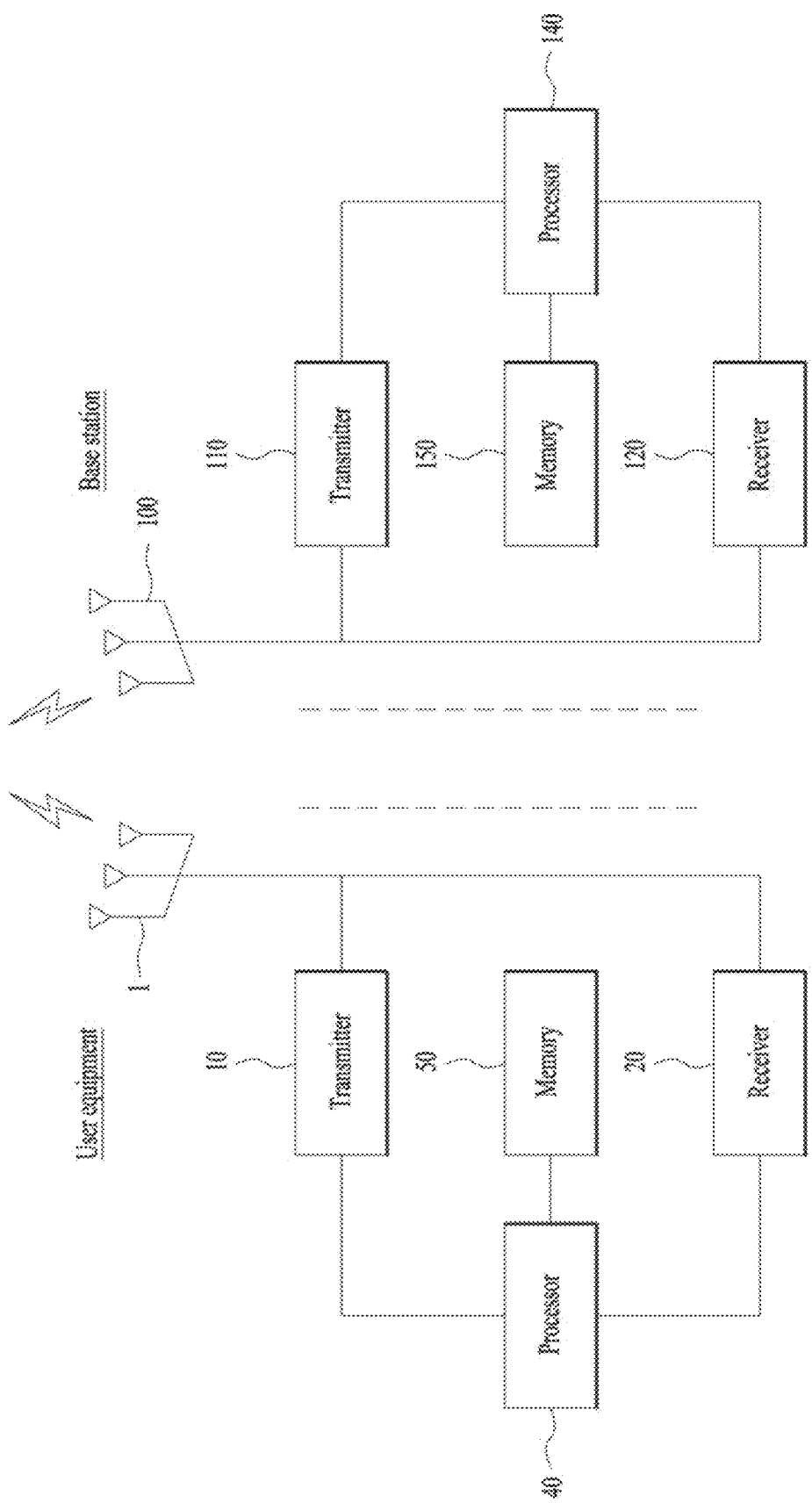
FIG. 26 is a diagram illustrating configurations of a UE and a base station in which proposed embodiments are implementable.

FIG. 26 is a diagram illustrating configurations of a UE and a base station capable of being implemented by the embodiments proposed in the present invention. The UE and the base station shown in FIG. 26 operate to implement the embodiments of a method of transmitting and receiving a signal between the UE and the base station.

A UE 1 may act as a transmission end on a UL and as a reception end on a DL. A base station (eNB) 100 may act as a reception end on a UL and as a transmission end on a DL. That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 is configured to receive a signal for scheduling uplink transmission in an Nth subframe (N is a natural number) via the receiver 20 from the eNB 100. When there is a currently performed first LBT prior to the Nth subframe, if a channel access priority class of a first LBT parameter for the first LBT is equal to or greater than a channel access priority class of a second LBT parameter for a second LBT indicated for the Nth subframe, the UE continuously performs the first LBT. When there is a currently performed first LBT prior to the Nth subframe, if a channel access priority class of a first LBT parameter for the first LBT is less than a channel access priority class of a second LBT parameter for a second LBT, the UE is configured to perform the second LBT. The UE can be configured to perform uplink transmission via the transmitter 10 based on an LBT result.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 26 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 180 or 190 and executed by the processor 120 or 130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of a user equipment (UE) in a wireless communication system supporting an unlicensed band, the method comprising:
   performing a first channel access procedure (CAP) based on a first channel access priority class parameter;
   receiving, from a base station (BS), a signal including a second channel access priority class parameter and scheduling information for uplink transmission in a specific time resource;
   performing the first CAP continuously based on the first channel access priority class parameter being equal to or greater than the second channel access priority class parameter;
   performing a second CAP based on the first channel access priority class parameter being less than the second channel access priority class parameter,
   wherein the second CAP is performed based on the second channel access priority class parameter; and
   performing the uplink transmission based on a result of the first CAP or the second CAP,
   wherein the first CAP is being performed before the specific time resource.

2. The method of claim 1, wherein, based on the first channel access priority class parameter being less than the second channel access priority class parameter, the first CAP is terminated.

3. The method of claim 1, wherein the first channel access priority class parameter comprises at least one of a first contention window size, a first maximum channel occupancy time, a first back-off counter or a first channel access priority class value, and
   wherein the second channel access priority class parameter comprises at least one of a second contention window size, a second maximum channel occupancy time, a second back-off counter or a second channel access priority class value.

4. A user equipment (UE) in a wireless communication system supporting an unlicensed band, the UE comprising:
   a receiver;
   a transmitter; and
   a processor configured to operate in a manner of being connected with the receiver and the transmitter,
   wherein the processor configured to:
   perform a first channel access procedure (CAP) based on a first channel access priority class parameter;
   receive, from a base station (BS), a signal including a second channel access priority class parameter and scheduling information for uplink transmission in a specific time resource;
   perform the first CAP continuously based on the first channel access priority class parameter being equal to or greater than the second channel access priority class parameter;
   perform a second CAP based on the first channel access priority class parameter being less than the second channel access priority class parameter,
   wherein the second CAP is performed based on the second channel access priority class parameter; and
   perform the uplink transmission based on a result of the first CAP or the second CAP,
   wherein the first CAP is being performed before the specific time resource.

5. The UE of claim 4, wherein based on the first channel access priority class parameter being less than the second channel access priority class parameter, the processor terminates the first CAP.

6. The UE of claim 4, wherein the first channel access priority class parameter comprises at least one of a first contention window size, a first maximum channel occupancy time, a first back-off counter or a first channel access priority class value, and
   wherein the second channel access priority class parameter comprises at least one of a second contention window size, a second maximum channel occupancy time, a second back-off counter or a second channel access priority class value.

* * * * *